(12) United States Patent
Chan et al.

(10) Patent No.: US 9,553,959 B2
(45) Date of Patent: Jan. 24, 2017

(54) CUSTOMIZED HARDWARE SELECTION FOR A MOBILE PHONE

(71) Applicant: Elwha LLC, Bellevue, WA (US)

(72) Inventors: Alistair K. Chan, Bainbridge Island, WA (US); Philip A. Eckhoff, Kirkland, WA (US); Roderick A. Hyde, Redmond, WA (US); Jordin T. Kare, Seattle, WA (US); David B. Tuckerman, Lafayette, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/520,770

(22) Filed: Oct. 22, 2014

(65) Prior Publication Data

US 2015/0141086 A1   May 21, 2015

Related U.S. Application Data

(63) Continuation-in-part of application No. 13/765,497, filed on Feb. 12, 2013, now Pat. No. 8,909,307, which is a continuation of application No. 13/340,463, filed on Dec. 29, 2011, now Pat. No. 8,391,934.

(51) Int. Cl.
| | |
|---|---|
| *H04M 1/00* | (2006.01) |
| *H04M 1/02* | (2006.01) |
| *H04B 5/00* | (2006.01) |
| *H02J 7/02* | (2016.01) |
| *H04M 1/725* | (2006.01) |

(52) U.S. Cl.
CPC ............ *H04M 1/0254* (2013.01); *H02J 7/025* (2013.01); *H04B 5/0037* (2013.01); *H04M 1/72575* (2013.01)

(58) Field of Classification Search
None
See application file for complete search history.

(56) References Cited

U.S. PATENT DOCUMENTS

| | | |
|---|---|---|
| 5,832,371 A | 11/1998 | Thornton |
| 5,848,152 A | 12/1998 | Slipy et al. |
| 6,171,138 B1 | 1/2001 | Lefebvre et al. |

(Continued)

FOREIGN PATENT DOCUMENTS

| | | |
|---|---|---|
| CN | 10-2074859 A | 5/2011 |
| DE | 2007/1022162 A1 | 11/2008 |

(Continued)

OTHER PUBLICATIONS

Supplementary European Search Report; European App. No. EP 12 86 3105; Nov. 12, 2015 (received by our Agent on Nov. 16, 2015); pp. 1-2.

(Continued)

*Primary Examiner* — Erika Washington
(74) *Attorney, Agent, or Firm* — Foley & Lardner LLP

(57) ABSTRACT

A mobile device includes a shell; a first replaceable hardware component received within the shell; and a second replaceable hardware component received within the shell, the second replaceable hardware component configured to receive a wireless power signal from a remote device and convert the power signal into electrical energy usable by the mobile device.

32 Claims, 24 Drawing Sheets

(56) References Cited

U.S. PATENT DOCUMENTS

| | | | |
|---|---|---|---|
| 6,356,543 B2 | 3/2002 | Hall et al. | |
| 6,492,897 B1 | 12/2002 | Mowery, Jr. | |
| 6,882,128 B1* | 4/2005 | Rahmel | H02J 17/00 320/101 |
| 7,092,519 B1 | 8/2006 | Lindholm | |
| 7,194,285 B2 | 3/2007 | Tom | |
| 7,414,855 B1 | 8/2008 | Arnold | |
| 7,921,553 B2 | 4/2011 | Wojack et al. | |
| 7,937,751 B2 | 5/2011 | Tom | |
| 8,180,395 B2 | 5/2012 | Moran et al. | |
| 8,391,934 B1 | 3/2013 | Chan et al. | |
| 8,909,307 B2 | 12/2014 | Chan et al. | |
| 2003/0119543 A1 | 6/2003 | Kfoury et al. | |
| 2004/0137664 A1 | 7/2004 | Elazar et al. | |
| 2004/0204131 A1 | 10/2004 | Parker | |
| 2004/0259587 A1 | 12/2004 | Chadha | |
| 2005/0170872 A1 | 8/2005 | Vuori et al. | |
| 2006/0168573 A1 | 7/2006 | Clark et al. | |
| 2008/0034075 A1 | 2/2008 | Luinstra et al. | |
| 2008/0198018 A1 | 8/2008 | Hartley | |
| 2009/0156252 A1 | 6/2009 | Harris | |
| 2009/0158446 A1 | 6/2009 | Harris | |
| 2010/0065630 A1 | 3/2010 | Spencer, II | |
| 2010/0320362 A1 | 12/2010 | Alpert et al. | |
| 2011/0082711 A1 | 4/2011 | Poeze et al. | |
| 2011/0159869 A1* | 6/2011 | Kurose | H04B 5/0037 455/423 |
| 2011/0165919 A1 | 7/2011 | Weiss et al. | |
| 2011/0175747 A1 | 7/2011 | Small et al. | |
| 2011/0256905 A1 | 10/2011 | Ryan | |
| 2011/0282476 A1 | 11/2011 | Hegemier et al. | |
| 2012/0106103 A1* | 5/2012 | Nohra | H04B 1/18 361/752 |
| 2013/0005252 A1* | 1/2013 | Lee | H04B 5/0037 455/41.1 |
| 2013/0153658 A1 | 6/2013 | Hopper et al. | |
| 2015/0205562 A1* | 7/2015 | Lin | G06F 3/1423 345/1.1 |
| 2015/0326073 A1* | 11/2015 | McKibben | H02J 17/00 320/108 |

FOREIGN PATENT DOCUMENTS

| | | |
|---|---|---|
| JP | 2001/309027 | 11/2001 |
| JP | 2005/159399 | 6/2005 |
| JP | 2008/521136 A | 6/2008 |
| JP | 2013-538548 | 10/2013 |
| KR | 10-2014-0108582 | 9/2014 |
| WO | WO00/59247 | 10/2000 |
| WO | WO00-59247 A1 | 10/2000 |
| WO | WO2008/016583 A2 | 2/2008 |

OTHER PUBLICATIONS

"Eco-Mobius"; Tactus.com; Created on Aug. 28, 2014, Printed on Aug. 28, 2014; p. 1; located at: blog.tactus.com/wp-content/uploads/2014/03/W02013110560579224542711.png.

"MDK-Project Ara"; Projectara.com; Created on Aug. 28, 2014, Printed on Aug. 28, 2014; pp. 1-2; located at: projectara.com/mdk/.

"Phonebloks"; Phonebloks.com; Created on Aug. 28, 2014, Printed on Aug. 28, 2014; pp. 1-1O; located at: phonebloks.com/en/about.

"Phonebloks: A Phone Worth Keeping"; Phonebloks.com; Created on Aug. 28, 2014, Printed on Aug. 28, 2014; pp. 1-5; located at: phonebloks.com/en.

"Springboard Expansion Slot"; Wikipedia; Bearing a date of Mar. 13, 2013, Printed on Sep. 3, 2014; pp. 1-6; located at: en.wikipedia.org/wiki/Springboard_Expansion_Slot.

Dawson, Tom; "ZTE Displays Modular Phone Concept Eco-Mobius off at CES 2014; to Compete With Motorola's Project Ara"; Androidheadlines.com; Bearing a date of Jan. 9, 2014, Printed on Aug. 28, 2014; pp. 1-7; locate at: androidheadlines.com/2014/01/zte-displays-modular-phone-concept-eco-mobius-off-at-ces-2014-to-competewith-motorolas-project-ara.html.

Kharif, Transforming the Cell Phone, Bloomberg Businessweek, Feb. 7, 2008, 2 pages.

PCT International Search Report; Application No. PCT/US 12/71208; Mar. 5, 2013; pp. 1-2.

SlashGear, Modular 'Lobster' Concept Has Snap-On GPS, Camera, http://www.slashgear.com/modular-lobster-concept-has-snap-on-gps-camera-057180, Sep. 21, 2011, 9 pages.

textually.org, Bug Labs Modular Cellphone, http://www.textually.org/textually/archives/2007/12/018177.htm, Dec. 7, 2007, 1 page.

European Patent Office, Supplementary European Search Report, Pursuant to Rule 62 EPC; App. No. EP 12863105; Mar. 23, 2016 (received by our Agent on Mar. 31, 2016); pp. 1-14.

PCT International Search Report; International App. No. PCT/US2015/056642; Mar. 23, 2016; pp. 1-4.

"What is PCMCIA?" located at http://www.iwebtool.com/what_is_pcmcia.html; 2008; pp. 1-3; IWEBTOOL.

* cited by examiner

| ITEM | NO. OF RECEIVERS | THICKNESS | RATINGS |
|---|---|---|---|
| RAM | 1 | THIN | 5 |
| GPU | 1 | THIN | 3 |
| USB PORT | 1 | THIN | 4.4 |
| ULTRA SOUND | 3 | THICK | 4 |
| HEART MONITOR | 2 | THICK | 4.3 |
| MAG STRIPE READER | 2 | THICK | 2 |
| USB PORT | 1 | THICK | 1 |
| AUDIO COMBO | 2 | THIN | 3 |
| USB-HDMI COMBO | 1-2 | THIN | 3.5 |

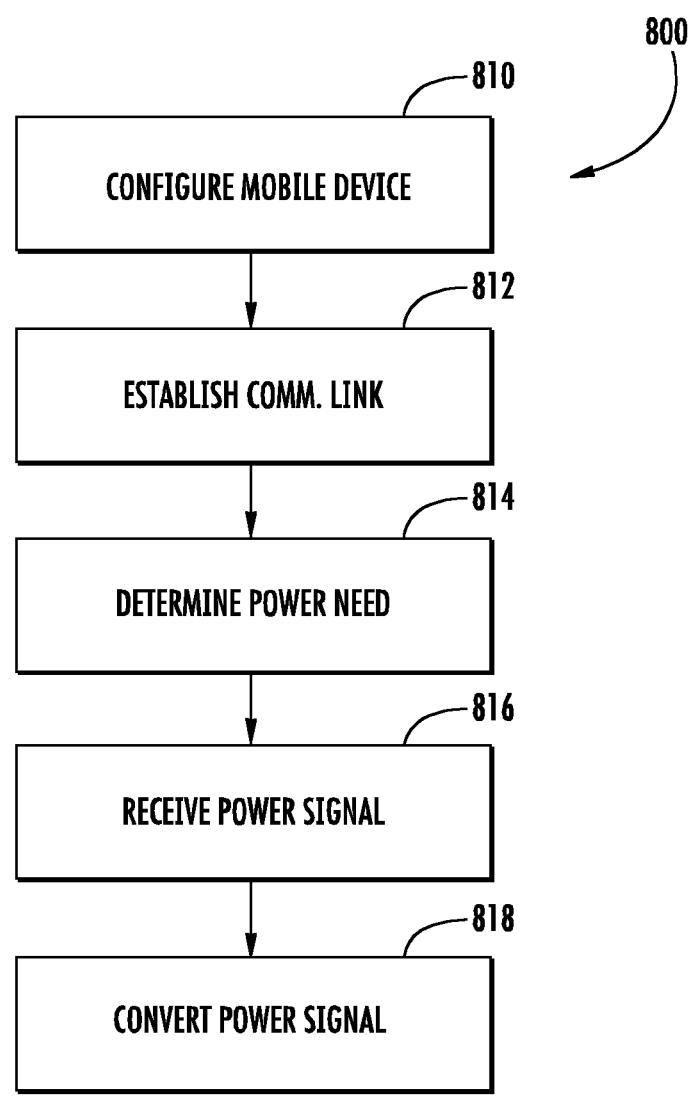

CUSTOMIZED HARDWARE SELECTION FOR A MOBILE PHONE

CROSS-REFERENCE TO RELATED PATENT APPLICATIONS

This application is a continuation-in-part of U.S. application Ser. No. 13/765,497, titled "Customized Hardware Selection for Mobile Phone," filed Feb. 12, 2013, which is a continuation of U.S. application Ser. No. 13/340,463, titled "Customized Hardware Selection for a Mobile Phone," filed Dec. 29, 2011. Both of these applications are incorporated herein by reference in their entireties.

BACKGROUND

The present disclosure relates generally to the field of mobile phones. More specifically, the present disclosure relates to the field of hardware customizable mobile phones.

Mobile phones are notoriously cramped for space, making it difficult to include new widgetry with limited, rather than universal, appeal. Traditionally, as the volume required for essential hardware has decreased, mobile phones have also gotten smaller. Some new widgets have been incorporated into at least some of the freed up space, but to maintain economies of scale, mobile phones and the accompanying widgets are generally not customizable. Users may select a desired phone with preselected widgets, but only from a limited selection offered by the mobile phone maker or its competitors. Thus, there is a need for a hardware customizable mobile phone with user selectable components.

SUMMARY

One embodiment relates to a mobile phone. The mobile phone includes a shell and a hardware component coupled to the shell, wherein the hardware component is selected from a set of interchangeable components having substantially the same size but different functions.

Another embodiment relates to a computerized method of customizing hardware for a mobile phone. The method includes receiving shell selection information from a user input device, identifying a set of hardware components, the set of hardware components generated based on a compatibility between the hardware components and the shell selection information, and outputting the identified set of compatible hardware components.

Another embodiment relates to a computerized method of customizing hardware for a mobile phone. The method includes receiving a hardware component selection information from a user input device, identifying a set of compatible mobile phone shells, the set of mobile phone shells generated based on a compatibility between the mobile phone shells and the hardware component selection information, and outputting the identified set of compatible mobile phone shells.

Another embodiment relates to a method of customizing hardware by an end user for a mobile phone. The method includes receiving from an end-user a selection of a mobile phone shell from a set of mobile phone shells, sending to the end-user a subset of interchangeable hardware components having different functions, and receiving from the end-user a selection of at least one hardware component from the subset of interchangeable hardware components. The subset of interchangeable hardware components is generated based on a compatibility between the selected mobile phone shell and the set of available interchangeable hardware components.

Another embodiment relates to a method of selling a mobile phone. The method includes offering to sell a hardware customizable mobile phone with one or more selectable hardware components configured to fit within a shell, offering a plurality of selectable options for at least one hardware component configured to fit within the shell, and receiving a selection of at least one hardware component configured to fit within the shell.

Another embodiment relates to a method of customizing hardware for a mobile phone. The method includes selecting a mobile phone shell from a set of mobile phone shells, and selecting at least one hardware component from a subset of interchangeable hardware components having different functions, the subset of interchangeable hardware components generated based on a compatibility between the selected mobile phone shell and the set of available interchangeable hardware components.

Another embodiment relates to a mobile device, including a shell; a first replaceable hardware component received within the shell; and a second replaceable hardware component received within the shell, the second replaceable hardware component configured to receive a wireless power signal from a remote device and convert the power signal into electrical energy usable by the mobile device.

Another embodiment relates to a mobile phone, including a shell; a first replaceable hardware component received within the shell; and a second replaceable hardware component received within the shell, the second replaceable hardware component configured to receive a radio frequency signal from a remote device and convert the radio frequency signal into electrical energy usable by the mobile phone.

Another embodiment relates to a mobile phone, including a shell; a first replaceable hardware component received within the shell; and a second replaceable hardware component received within the shell, the second replaceable hardware component configured to receive a laser beam from a remote device and convert the laser beam into electrical energy usable by the mobile phone.

Another embodiment relates to a method of providing electrical energy to a mobile device, including inserting a replaceable hardware component within a shell of a mobile device; receiving a wireless power signal by the replaceable hardware component; and converting, by the replaceable hardware component, the wireless power signal into electrical energy usable by the mobile device.

Another embodiment relates to a method of providing electrical energy to a mobile phone, including inserting a replaceable hardware component within a shell of a mobile phone; receiving a radio frequency signal by the replaceable hardware component; and converting, by the replaceable hardware component, the radio frequency signal into electrical energy usable by the mobile phone.

Another embodiment relates to a method of providing electrical energy to a mobile device, including inserting a replaceable hardware component within a shell of a mobile device; receiving a laser beam by the replaceable hardware component; and converting, by the replaceable hardware component, the laser beam into electrical energy usable by the mobile phone.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and processes described herein, as defined solely by the claims, will become apparent in the detailed description set forth herein and taken in conjunction with the accompanying drawings.

BRIEF DESCRIPTION OF THE DRAWINGS

FIG. 30 is a flow chart of a method of providing power to a mobile device according to one embodiment.

DETAILED DESCRIPTION

Referring generally to the figures, systems and methods for a hardware customizable mobile phone and components thereof are shown according to various exemplary embodiments. A hardware customizable mobile phone generally includes a shell and one or more selectable hardware components coupled to the shell, either directly or indirectly (e.g., via a circuit board). For example, the selectable hardware component may plug into a receiver located in the phone. The selectable hardware components may come from a set of components having substantially the same size, but different functions. The selectable hardware components may be interchangeable with other hardware components from the same set or from a second set of components. The second set of components may have the same or different function and a different size, yet still be compatible with the receiver and the size of the shell. Methods of customizing a mobile phone are also described. According to one embodiment, a user may select a shell from a set of available mobile phone shells or select a hardware component from a set of available hardware components. The user is then provided with a subset of mobile phone shells or a subset of hardware components that are compatible with the selected shell or component. Compatibility may be based on a size value (e.g., length, width, thickness, area, volume, etc.), shape of the hardware component, power consumption, or receiver availability of the shell or other components. The user may then continue to select a shell or additional hardware components to further customize the mobile phone.

It should further be noted that for purposes of this disclosure, the term coupled means the joining of two members directly or indirectly to one another. Such joining may be stationary in nature or moveable in nature and such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
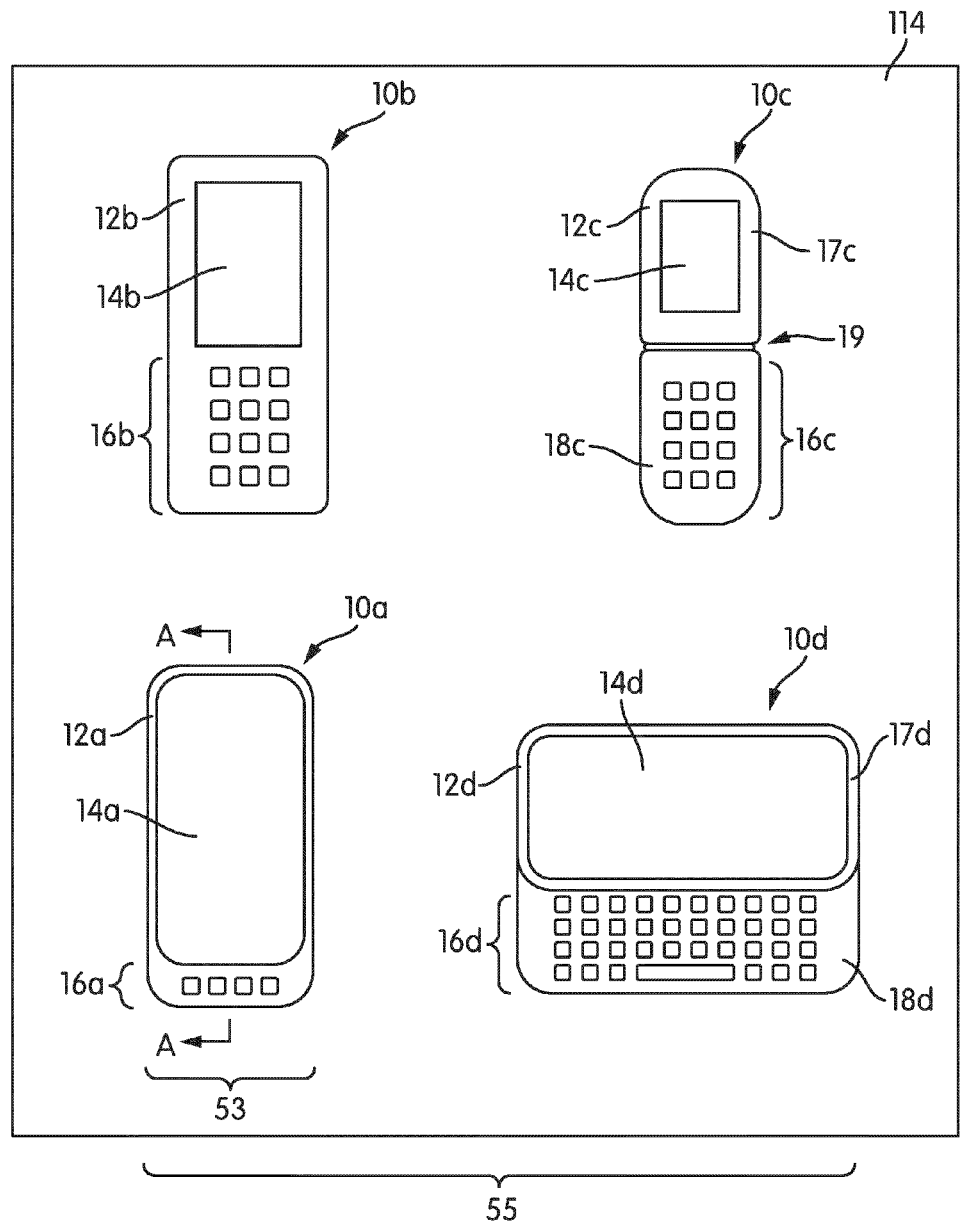
FIG. 1 is an exemplary display showing a variety of mobile phones, shown according to various exemplary embodiments.

Referring to FIG. 1, a display 114 shows a variety of mobile phones 10, according to various exemplary embodiments. Mobile phones 10 come in varying shapes (e.g., style, external appearance, curvilinearity, etc.) and sizes (e.g., height, width, length, area, volume, etc.). Mobile phones 10 generally include a shell 12, a display 14, and a user input device 16 (keypad, keyboard, button, trackball, touchscreen, end-user input device, etc.). A shell 12 is a generally rigid structure or housing configured to be grasped by a user and to protect the internal components of the mobile phone 10 from liquids, debris, impact or other contaminants. The shell 12 may include a removable cover configured to provide access to internal components such as a battery, SIM card, etc. A touchscreen style of mobile phone, shown as mobile phone 10a, includes a shell 12a, a touch-sensitive display 14a, one or more bezel or soft buttons 16a. A classic (e.g., candybar) style of mobile phone, shown as mobile phone 10b, includes a shell 12b, a display 14b, and a keypad 16b. A clamshell (e.g., flip-phone) style of mobile phone, shown as mobile phone 10c, includes a shell 12c having an upper portion 17c and a lower portion 18c hingedly coupled by a joint 19. The clamshell mobile phone 10c includes a display 14c located on upper portion 17c, and a keypad 16c located on lower portion 18c. A slideout (e.g., slider) style of mobile phone, shown as mobile phone 10d, includes a shell 12d having an upper portion 17d and a lower portion 18d, which are slidably coupled. The slideout mobile phone 10d includes a display 14d, which may be touch-sensitive, located on upper portion 17d, and a keypad 16d (e.g., a numerical keypad, an alphanumeric keyboard, etc.) located on lower portion 18d.

Figure 2A:
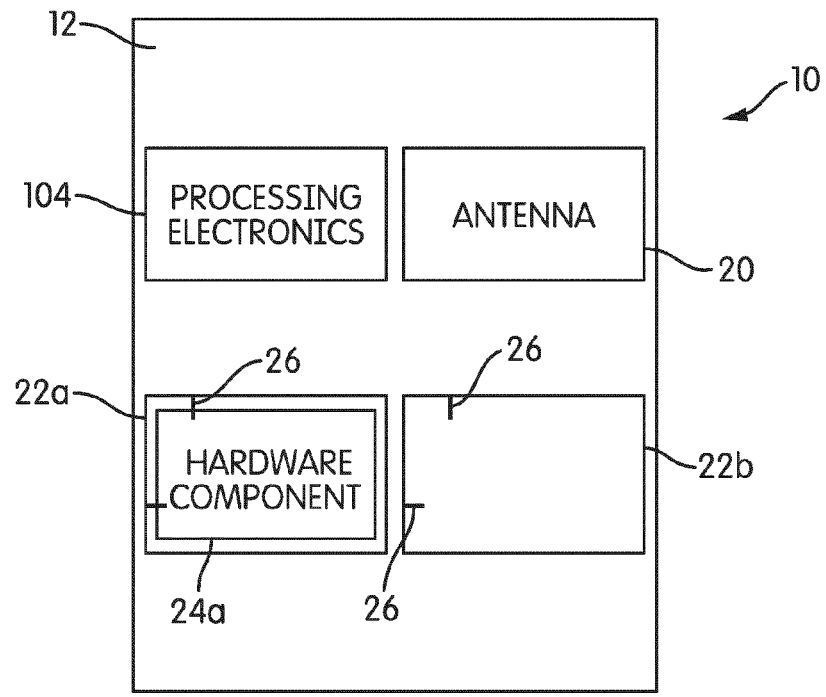
FIGS. 2A-2C are schematic block diagrams of mobile phones, shown according to exemplary embodiments.
Figure 2B:
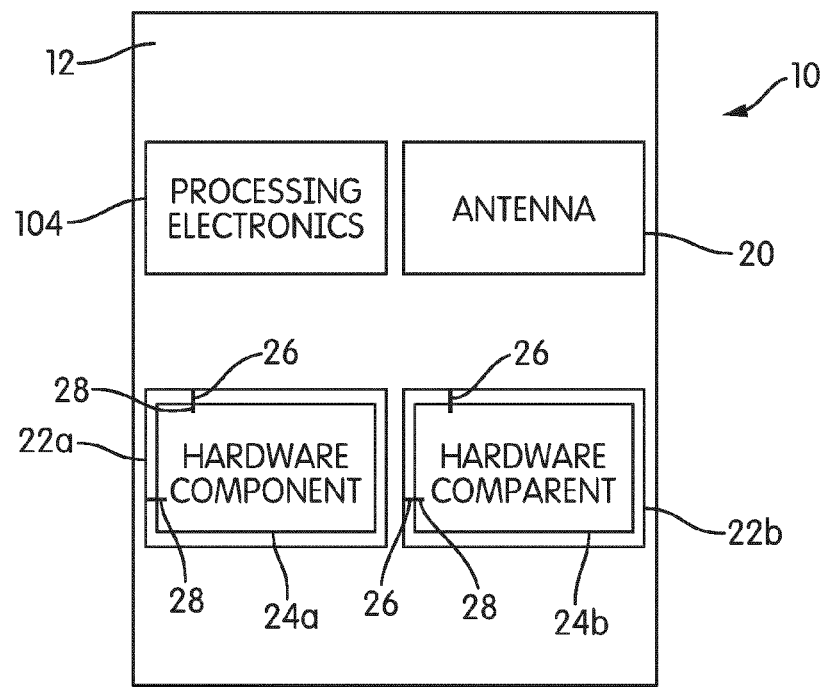
Figure 2C:
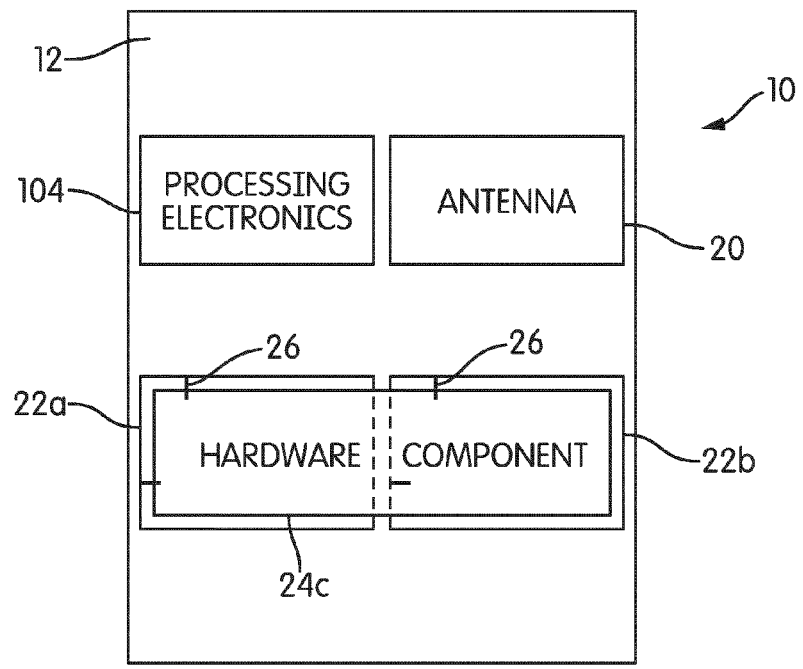

Referring to FIGS. 2A-2C, schematic block diagrams of a mobile phone 10, shown as the touchscreen style mobile phone, are shown, according to exemplary embodiments. The mobile phone 10 is shown to include a shell 12, an antenna 20, and a processing electronics 104. The antenna 20 may be configured for communication with a cellular network, and the antenna 20 and the processing electronics 104 may be coupled to the shell 12, either directly or indirectly (e.g., via a circuit board, etc.). According to an exemplary embodiment, some hardware components are non-interchangeable. For example, the display 14, keyboard 18, processing electronics 104 (e.g., processor, etc.), antenna 20, and a camera may be may be permanently fixed to the shell or coupled to the shell 12 in a manner that is not intended for interchangeability or in a manner that makes interchanging hardware components prohibitively difficult. For example, the display 14 may be coupled to the shell 12 with the use of an adhesive (e.g., a room temperature vulcanization adhesive).

Figure 9:
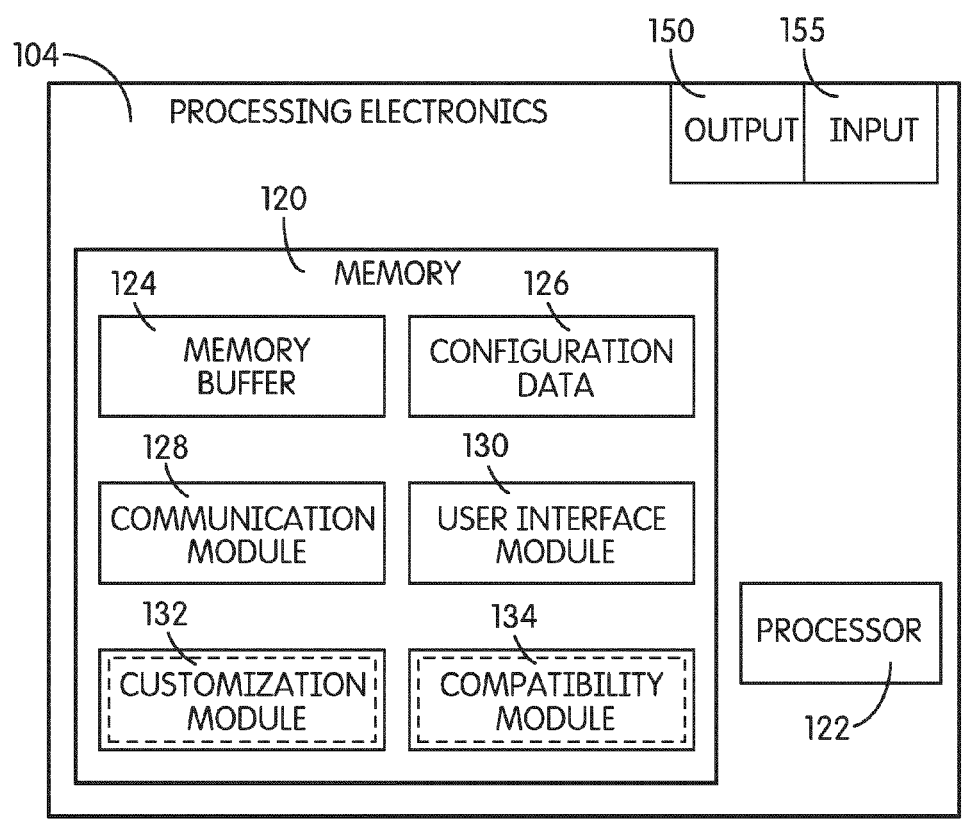
FIG. 9 is a detailed block diagram of processing electronics, shown according to an exemplary embodiment.

Briefly referring to FIG. 9, a detailed block diagram of the processing electronics 104 of FIG. 2A is shown, according to an exemplary embodiment. Processing electronics 104 includes a memory 120 and processor 122. Processor 122 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 122 is configured to execute computer code stored in memory 120 to complete and facilitate the activities described herein. Memory 120 can be any volatile or non-volatile memory device capable of storing data or computer code relating to the activities described herein. For example, memory 120 is shown to include modules 128-130 which are computer code modules (e.g., executable code, object code, source code, script code, machine code, etc.) configured for execution by processor 122. When executed by processor 122, processing electronics 104 is configured to complete the activities described herein. Processing electronics includes hardware circuitry for supporting the execution of the computer code of modules 128-130. For example, processing electronics 104 includes hardware interfaces (e.g., output 150) for communicating control signals (e.g., analog, digital) from processing electronics 104 to one or more circuits coupled to processing electronics 104. Processing electronics 104 may also include an input 155 for receiving data or signals from other systems or devices.

Memory 120 is shown to include a memory buffer for receiving and storing data, for example user input, downloaded data, etc., until it is accessed by another module or process. Memory 120 is further shown to include a communication module 128, which may include logic for communicating between systems and devices. For example, the communication module 128 may be configured to use an antenna or data port for communication over a network. The communication module 128 may further be configured to communicate with other components within the mobile phone over a parallel bus, serial bus, or network. Memory 120 is further shown to include a user interface module 130, which includes logic for using user input data in memory buffer 124 or signals from input 155 to determine desired user responses. For example, the user interface module 130 may be configured to convert, transform, or process signals or data from a keyboard, mouse, or touchscreen into signals or data useable by processor 122.

The shell 12 is further shown to include one or more receivers 22 (e.g., portion, region, socket, connector, etc.), shown as, a first receiver 22a and a second receiver 22b, which may be coupled directly or indirectly (e.g., via a circuit board, etc.) to the shell 12. Each receiver 22 is configured to receive, support, or couple to a hardware component 24 (e.g., interchangeable hardware component, selectable hardware component, widget, element, etc.) of a certain size and configuration. As shown, the first receiver 22a is configured to receive a first hardware component 24a selected from a first set of components having substantially the same size but different functions. Hardware components 24 selected from the first set of hardware components may be interchangeable (e.g., swappable, substitutable, etc.) with other hardware components 24 in the first set of components. According to one embodiment, the interchangeable hardware components 24 of the first set have substantially the same shape.

The mobile phone 10 may include a second receiver 22b, which is configured to receive a second hardware component 24b selected from a second set of components having substantially the same size but different functions. The first receiver 22a and the second receiver 22b may be the same or different sizes. According to an exemplary embodiment, the first receiver 22a and the second receiver 22b have similar dimensions (e.g., length, width, area, volume, etc.), in which case a hardware component 24 may be installed in either the first receiver 22a or the second receiver 22b. It is not necessary that every receiver 22 have a hardware component 24 directly coupled (e.g., plugged in, inserted, installed, snapped in, connected, etc.) to it. For example, referring to FIG. 2A, a first hardware component 24a is coupled to the first receiver 22a, but no hardware component is coupled to the second receiver 22b.

Referring to FIG. 2C, it is further contemplated that a larger hardware component, shown as third hardware component 24c, may be disposed in both the first receiver 22a and the second receiver 22b. The third hardware component may be selected from a third set of components having substantially the same size but different function.

Each receiver 22 may include one or more electrical contacts 26 which are configured to electrically couple to the hardware component 24. According to an exemplary embodiment, each of a set of hardware components 24 is configured to electrically couple to a set of electrical contacts 26. Referring to FIGS. 2A-2B, a hardware component 24 may be configured to couple only to the contacts 26 in one receiver 22. Referring to FIG. 2C, a hardware component 24 may be configured to couple to contacts 26 in more than one receiver 22.

Figure 3:
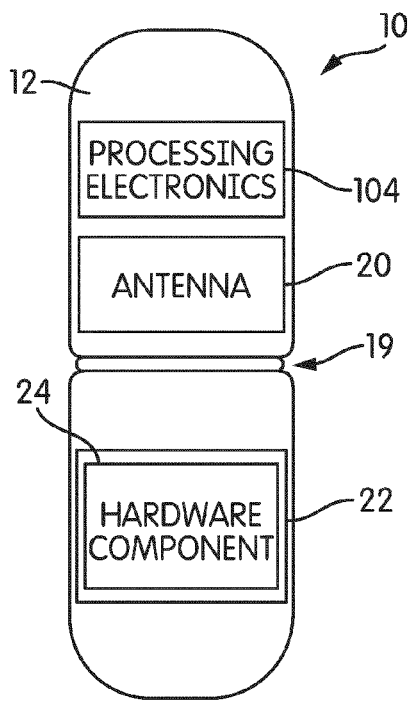
FIG. 3 is a schematic block diagram of a mobile phone, shown according to another embodiment.

Referring generally to FIGS. 2-4, the hardware component 24 may have compatible shapes and sizes. For example, a set of hardware components 24 may be the same size and, therefore, be exchangeable between receivers 22. A set of hardware components 24 may be mutually interchangeable. For example, a third hardware component 24c may be the same size as the combination of a first hardware component 24a and a second hardware component 24b. As described above, a set of hardware components 24 may be include pre-specified electrical connections 28 to the mobile phone 10. As shown, in FIG. 2B, the number and arrangement of the contacts 26 in first receiver 22a and second receiver 22b enables the first and second hardware component 24a, 24b to be placed in either receiver. As shown, in FIG. 2C, the number and arrangement of contracts 26 in the first and second receivers 22a, 22b enables the third hardware component 24c to be installed across both receivers 22. Providing a standardized number and arrangement of contacts in the receivers 22 facilitates construction of hardware components that are compatible with the mobile phone 10. It is further contemplated that a set of hardware components may include pre-specified optical connections to the mobile phone 10, and that the hardware components 24 may include pre-specified electrical or optical connections to each other. For example, the third hardware component 24c may be configured to allow the first hardware component 24a to piggy-back thereon. Enabling piggy-backing facilitates the installation of larger or multi-receiver hardware components 24 without inherently requiring the removal of other hardware components. A set of hardware components 24 may have standard sizes or power consumptions to facilitate interchangeability. A set of hardware components 24 may be configured to have a standard component dimensions (e.g., area, volume, etc.) or to fit within a standard shell volume.

The hardware components 24 may have a variety of functions. According to one embodiment, a hardware component 24 may be a connector, e.g., a Universal Serial Bus (USB) connector, an IEEE 1394 connector, a DisplayPort connector, a Digital Visual Interface connector, a coaxial cable connector, a High Definition Multimedia Interface connector, a registered jack, a TRS connector, or miniaturized versions thereof. In this embodiment, a user may insert a TRS connector hardware component into a first receiver 22a in order to output an analog signal, for example, to headphones. The user may then replace the TRS connector hardware components with a mini-USB connector hardware component in order to output a digital signal, for example, to a computer. According to an exemplary embodiment, the processing electronics 104 may include computer code (e.g., software, firmware, drivers, etc.) in the configuration data 126 of memory 120 to support communication between the processing electronics 104 and the hardware component. According to another embodiment, the hardware component 24 may include computer code (e.g., software, firmware, drivers, etc.) configured to support communication between the hardware component 24 and the processing electronics 104.

According to various other embodiments, the hardware component 24 may include an ultrasonographic transducer, a heart monitor, a blood glucose tester, or an infrared camera. The hardware component 24 may include a micro impulse radar transducer, which may be configured to detect a heartbeat or the presence of an object or person on the other side of a wall or door. The hardware component 24 may include a food tester, for example, componentry configured to detect the presence of an allergen such as peanuts, fish, dairy, etc. The hardware component 24 may include a magnetic stripe reader, which may be used for the swiping or reading of data stored on a credit card. The hardware component 24 may include an RFID reader, which may be used for detecting and receiving information on a radio-frequency identification chip. The hardware component 24 may include an accident data recorder (e.g., flight recorder, black box, etc.), which may be configured for example to record location, velocity, acceleration information. The accident data recorder may include an accelerometer or gyroscope and may be configured to store peak information data or to stop overwriting data in response to a severe acceleration or deceleration. This may be useful, for example, for accident reconstruction purposes or for a parent monitoring the driving behavior of a teenage dependent. The hardware component 24 may include a power source (e.g., fuel cell, battery, solar cell, etc.). According to one embodiment, a small battery may couple a first receiver 22a, and larger battery (e.g., more powerful, longer life, etc.) may couple to first and second receivers 22a, 22b. The hardware component may include processing electronics (e.g., a microprocessor, memory etc.). For example, a user may insert a graphics processing unit into the mobile phone 10 to improve a gaming experience, or to support a video projector (which may be another hardware component 24). The hardware component 24 may include a display. For example, a user may install a hardware component 24 containing additional volatile memory (e.g., RAM) or non-volatile memory (e.g., flash memory, etc.). According to another embodiment, the user may install a card reader hardware component (e.g., SIM card, SD card, etc.) into the mobile phone 10. The hardware component 24 may include a speaker or a microphone to facilitate the playing or recording of audio signals. The hardware component 24 may include a keyboard, keypad, trackball, touchpad, or other user input device. The hardware component 24 may include a biometric identification reader (e.g., fingerprint reader, retinal scanner, etc.), which may be used to enhance security of the mobile phone 10. The hardware component 24 may include an antenna (e.g., shortwave radio, amplitude modulation (AM), frequency modulation (FM), global system for mobile communication (GSM), code division multiple access (CDMA), 3G, 4G, global positioning system (GPS), echolocation (e.g., sonar), etc.), which may allow a user to receive or transmit signals. For example, a user having a 3G antenna, may elect to replace the antenna with a 4G antenna when the technology becomes available in their location, or a user may elect to replace a CDMA antenna with a GSM antenna when travelling in a GSM dominant country. For another example, a user may install an AM or FM antenna in order to listen to a radio broadcast.

According to a preferred embodiment, the hardware component 24 is disposed at least partially within the shell 10. For example, it is contemplated that a transducer, connector, or camera may extend partially out of the shell 10 in order to emit, connect, or receive as necessary. According to other embodiments, the hardware component 24 is disposed completely within the shell 10. In these embodiments, it may be necessary to open the shell 10 (e.g., remove a cover) in order to remove or swap a hardware component 24.

According to various embodiments, the first hardware component 24a, the second hardware component 24b, the third hardware component 24c, or the interchangeable hardware components 24 generally may be selected by and end-user. An end-user may be a purchaser of the mobile phone 10 or an intended long-term possessor. According to other embodiments, the end-user may be an intermediary, for example, a person configuring the phone to resell (e.g., a retailer), lease, gift, (e.g., friend, family, etc.), or provide (e.g., coworker, employer, IT department, etc.) to another.

Referring to FIG. 3, a schematic block diagram of a mobile phone 10, shown as a clamshell style mobile phone 10c, is shown according to an exemplary embodiment. As shown, the size and shape of the mobile phone 10 may dictate that only one receiver 22 can fit within the shell 12. Accordingly, the mobile phone 10 of FIG. 3 would not be able to accept the hardware component 24c of FIG. 2C. Thus, a hardware component 24 for use in the mobile phone 10 may be selected from a subset of components that are compatible with the size and shape of the receiver of the mobile phone 10.

Figure 4A:
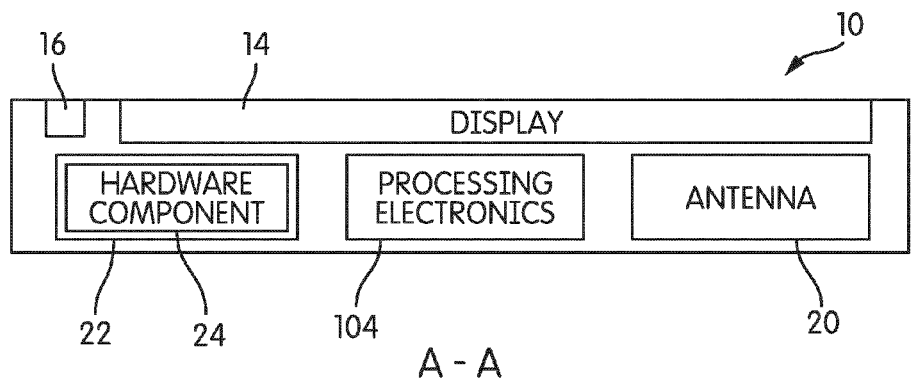
FIGS. 4A-4D are detailed schematic block diagrams of cross-sectional side-elevation views of mobile phones, shown according to an exemplary embodiment.
Figure 4B:
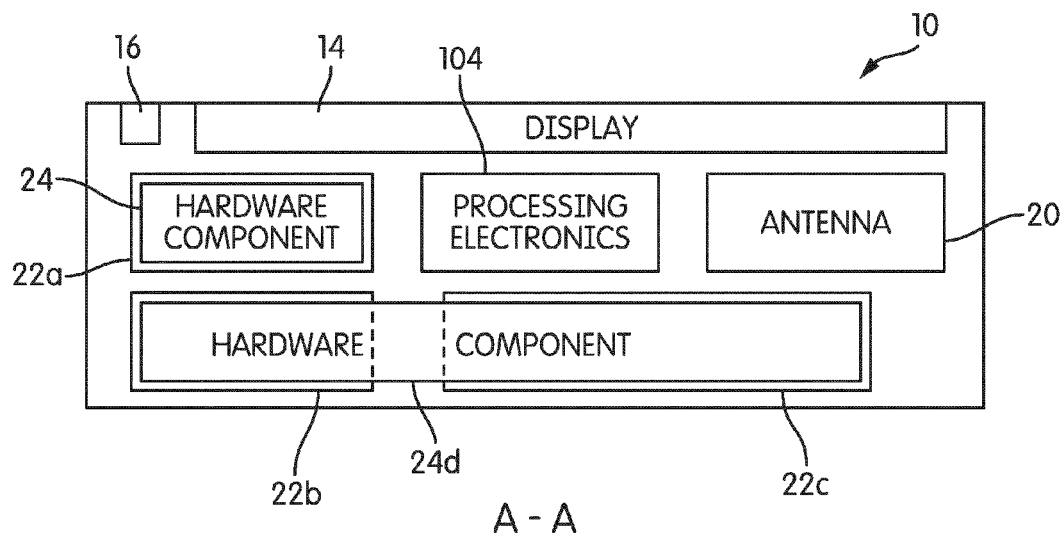
Figure 4C:
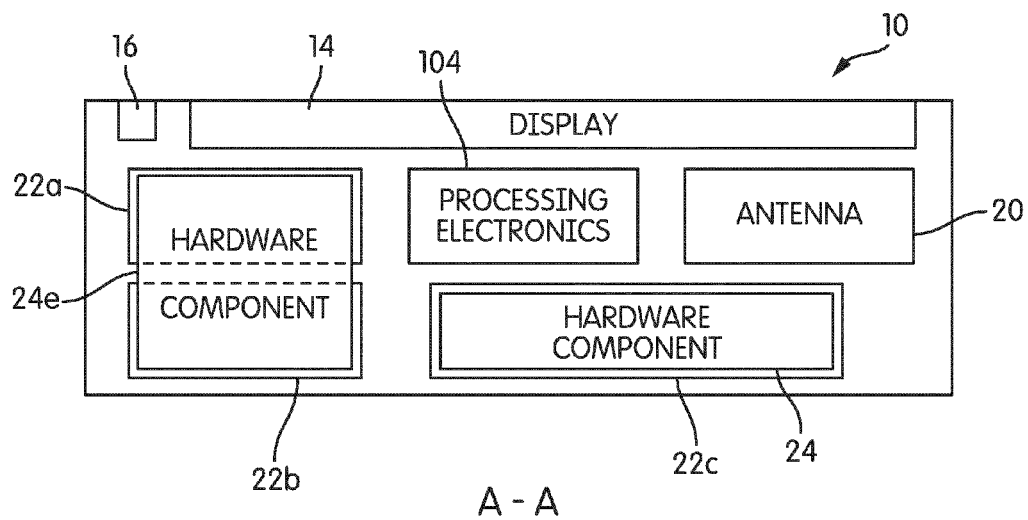
Figure 4D:
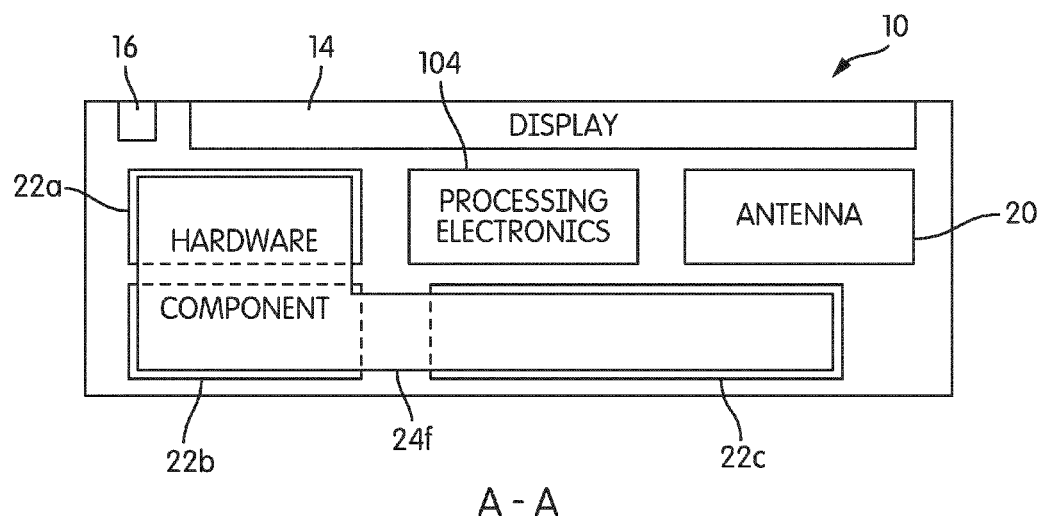

Referring to FIGS. 4A-4D, cross-sectional schematic block diagrams of a mobile phone 10, shown generally as the a touchscreen style of mobile phone 10a of FIG. 1, are shown according to exemplary embodiments. The mobile phone 10 of FIG. 4A is shown to include a shell 12 having a relatively thin cross-section and to include a first receiver 22a. In contrast, the mobile phones 10 of FIGS. 4B-4D are shown to include shells 12 having thicker cross-sections, which accommodate a second receiver 22b and a third receiver 22c below or behind the first hardware component 24a, the processing electronics 104, and the antenna 20. The mobile phone 10 of FIG. 4B is shown to accommodate a longer hardware component 24d across (e.g., in, among, between, etc.) the second receiver 22b and third receiver 22c. The mobile phone 10 of FIG. 4C is shown to accommodate a thicker hardware component 24e across (e.g., in, among, between, etc.) the first receiver 22a and the second receiver 22b. As shown, the third receiver 22c is configured to receive a different sized hardware component 24 than each of first and second receivers 22a, 22b. Accordingly the set of hardware components 24 configured to fit into the third receiver 22c are interchangeable with each other, but are not interchangeable with the set of hardware components 24 configured to fit into the first or second receivers 22a, 22b. The mobile phone 10 of FIG. 4D is shown to accommodate a larger, more complex hardware component 24f across (e.g., in, among, between, etc.) the first receiver 22a, the second receiver 22b, and the third receiver 22c. According to the embodiments shown, the thicker hardware components 24e, 24f of FIGS. 4C and 4D would not fit into the thin shell of FIG. 4A. According to various other embodiments, the number and arrangement of receivers 22 and the shape and size of hardware components 24 create a vast number of possible combinations of hardware components 24 within a shell 12, and, in effect, create a three-dimensional puzzle.

In contrast, conventional wisdom has been to constantly drive mobile phones to be smaller and smaller, thinner and thinner. These ever-shrinking phones leave no room for extra components, let alone interchangeable hardware components. However, with the customizable mobile phones disclosed herein, a user may select a larger (e.g., wider, longer, thicker, etc.) mobile phone in order to accommodate additional receivers or to accommodate a particularly desired selectable hardware component. Alternatively, a user may select a smaller phone knowing that he or she may swap out the interchangeable hardware components.

It should be noted that a particular style of mobile phone 10 does not inherently dictate its size or the number of receivers 22 within its shell 12. For example, the clamshell style mobile phone 10c of FIG. 3 is shown to only include one receiver 22; however, a user may select a longer, wider, or thicker clamshell phone 10c in order to accommodate additional receivers 22 or additional or larger selectable hardware components 24.

According to one embodiment, the portion of the volume of the interchangeable hardware components 24 occupy a greater portion of the volume of the shell 12 than the non-interchangeable hardware components (e.g., display 14, user input device 16, processing electronics 104, and antenna 20. According to another embodiment, the interchangeable hardware components 24 occupy at least 50 percent of the volume of the shell 12. According to another embodiment, the interchangeable hardware components 24 occupy at least 90 percent of the volume of the shell 12.

Referring to FIGS. 1 and 5-8, a system in which a user (e.g., an end-user) may customize a mobile phone is shown according to an exemplary embodiment. A client 110 is shown to communicate with a server 102 over a network 100 (e.g., local area network, wide area network, internet, etc.). The client 110 may include display 114, processing electronics 104c, and a user input device 116. The user input device 116 may be a keyboard, a keypad, a mouse, a trackball, a touchscreen, etc. The client 110 may be any suitable computing device, for example, a home computer, a portable computing device, a mobile phone, an in-store kiosk, etc.

As described above with respect to processing electronics 104, and referring generally to FIG. 9, processing electronics 104c may include a memory 120 and processor 122. Processor 122 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 122 is configured to execute computer code stored in memory 120 to complete and facilitate the activities described herein. Memory 120 can be any volatile or non-volatile memory device capable of storing data or computer code relating to the activities described herein. For example, memory 120 is shown to include modules 128-132 which are computer code modules (e.g., executable code, object code, source code, script code, machine code, etc.) configured for execution by processor 122. When executed by processor 122, processing electronics 104c are configured to complete the activities described herein. Processing electronics include hardware circuitry for supporting the execution of the computer code of modules 128-132. For example, processing electronics 104c include hardware interfaces (e.g., output 150) for communicating control signals (e.g., analog, digital) from processing electronics 104c to one or more circuits coupled to processing electronics 104c. Processing electronics 104c may also include an input 155 for receiving data or signals from other systems or devices. Memory 120 is shown to include a customization module 132 which may include logic for transforming data or signals from a user input module 130 or memory buffer 124 into information (e.g., selection information, preference information, etc.) which may be sent to the server 102.

The server 102 is shown to include processing electronics 104s. As described above with respect to processing electronics 104 and 104c, and referring generally to FIG. 9, the processing electronics 104s may include a memory 120 and processor 122. Processor 122 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 122 is configured to execute computer code stored in memory 120 to complete and facilitate the activities described herein. Memory 120 can be any volatile or non-volatile memory device capable of storing data or computer code relating to the activities described herein. For example, memory 120 is shown to include modules 128 and 134 which are computer code modules (e.g., executable code, object code, source code, script code, machine code, etc.) configured for execution by processor 122. When executed by processor 122, processing electronics 104s are configured to complete the activities described herein. Processing electronics include hardware circuitry for supporting the execution of the computer code of modules 128 and 134. For example, processing electronics 104s includes hardware interfaces (e.g., output 150) for communicating control signals (e.g., analog, digital) from processing electronics 104s to one or more circuits coupled to processing electronics 104s. Processing electronics 104s may also include an input 155 for receiving data or signals from other systems or devices. Memory 120 is shown to include a compatibility module 134 which may include logic for receiving selection or preference information from a client and providing a set of compatible shells or a set of compatible hardware components.

Figures 5, 6:
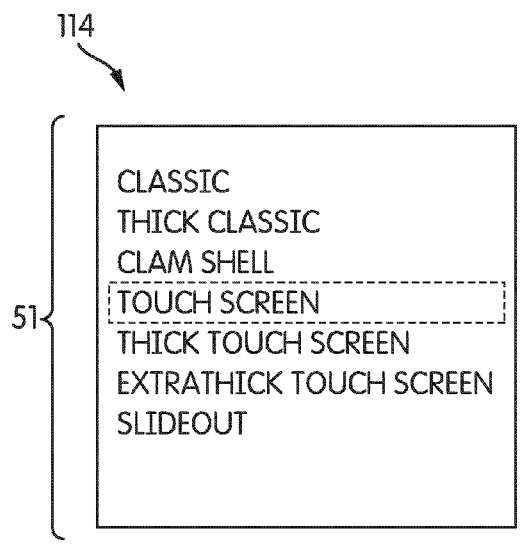
FIG. 5 is an exemplary display showing a list of mobile phone shells, shown according to an exemplary embodiment.
FIG. 6 is an exemplary display showing a list of hardware components, shown according to an exemplary embodiment.

The user may first select a mobile phone shell 12 from a set of mobile phone shells 12. Referring to FIG. 5, the user may select from a list 51 of shells, for example, shown on a display 114. The user may select from the list 51 by selecting or clicking on the text, checking a box, selecting a radio button, or any other suitable method of selection. Referring to FIG. 1, the user may select from one or more images 53, 55 of the mobile phone shells 12, for example, shown on a display 114. The list or images of the mobile phone shells 12 may be provided by and caused to be displayed by the server 102. The set of shells 12 may include different styles, shapes, and sizes of mobile phone shells. The user may select a mobile phone shell 12 based on at least one of size, volume, and shape. The user may also provide or select a weight preference information (e.g., preferred weight of the mobile phone, a preferred weight range of the mobile phone, a priority of the weight of the mobile phone relative to other factors, etc.). The user may also provide or select a cost preference information (e.g., preferred cost or price of the mobile phone, a preferred cost or price range of the mobile phone, a priority of the cost or price the mobile phone relative to other factors, etc.).

The user selection may be sent from the client 110 to the server 102 as shell selection information. If provided, the weight preference information and the cost preference information may also be sent from the client 110 to the server 102. The server 102, in turn, receives the shell selection information, weight preference information, and/or the cost preference information. The server 102 may generate or identify a subset of all available hardware components based on a compatibility between hardware components 24 and the shell corresponding to the shell selection information. According to another embodiment, the server 102 may receive the generated set of hardware components 24 from another computer.

The compatibility between the mobile phone shell 12 and the selectable or interchangeable hardware components 24 may be based on at least one size value (e.g., length, width, thickness, area, volume, shape, etc.). For example, the volume of the thicker hardware component 24e of FIG. 4C would not fit within the thinner shell 12 of FIG. 4A. Similarly, the complex hardware component 24f of FIG. 4D would not fit within the shells 12 of FIG. 3 or 4A. The compatibility may be based on at least one of the number and arrangement of receivers 22 and electrical contacts 26 available in the shell 12 that corresponds to the shell selection information. If received, compatibility may be based on the weight preference information and/or the cost preference information.

Figure 7:
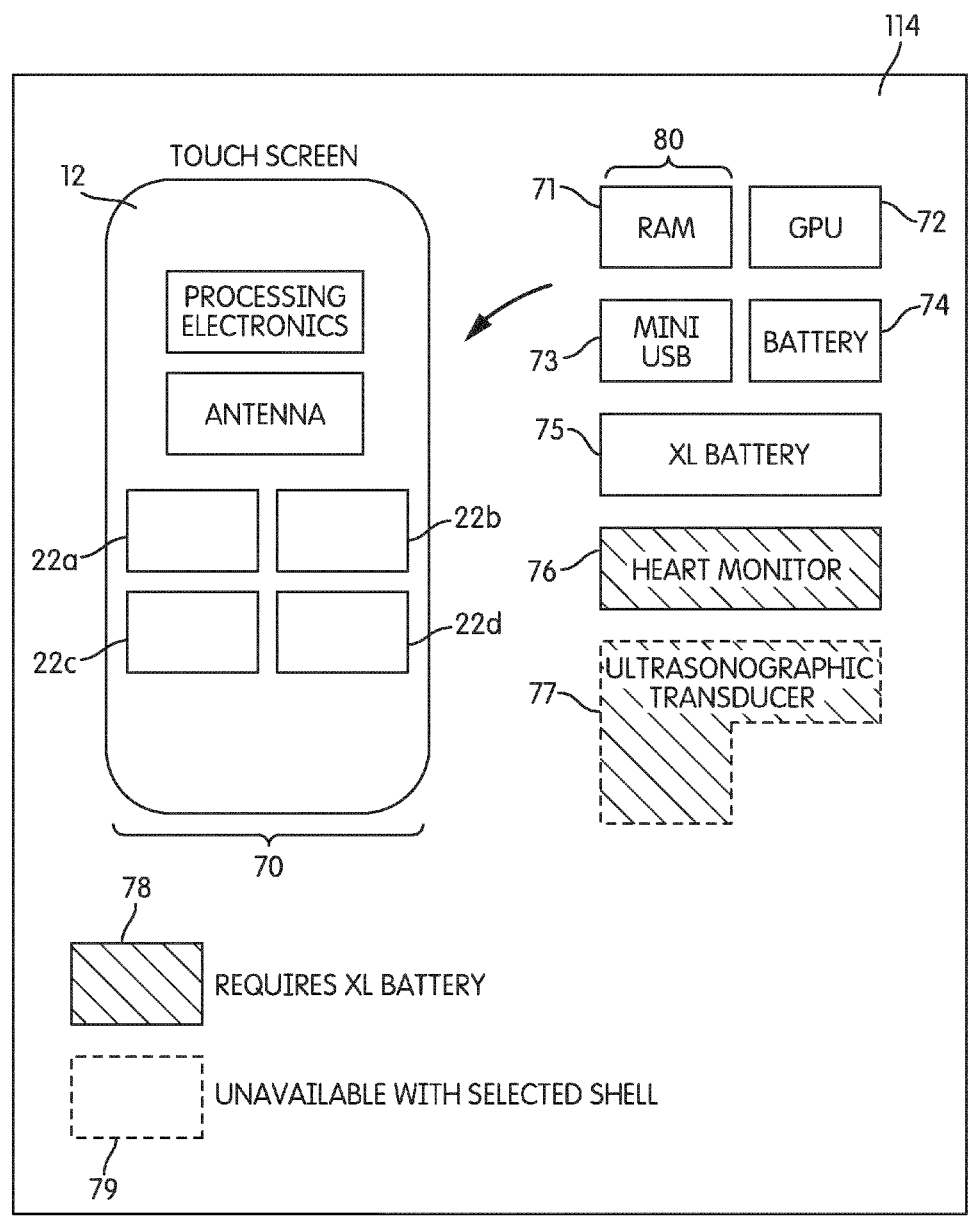
FIG. 7 is an exemplary display showing images of a mobile phone shell and hardware components, shown according to an exemplary embodiment.

The server 102 may then provide a subset of hardware components 24 that are compatible with the selected mobile phone shell 12. Referring to FIGS. 6 and 7, the subset of compatible hardware components 24 may be provided as a list 61 or as an image 70. The server may also provide an auxiliary information relating to the hardware components 24. For example, the list 61 or image 70 may also include a size, a weight, a cost, a rating, and a backlog (i.e., time until delivery) of the hardware component. The subset of selectable hardware components 24 which are incompatible with the shell selection information (e.g., are not part of the subset of compatible hardware components 24 generated based on a compatibility between hardware components 24 and the selected shell 24) may either not be provided or may be provided along with an indicia of incompatibility (e.g., strikethrough, grayed out, dashed outline, etc.). According to another embodiment, the subset of hardware components 24 may be stored to a memory for use in a non-graphical process, e.g., an order fulfillment system. For example, the output may be provided to an assembly facility as described further below.

The system may also provide an indication that the compatibility of a hardware component 24 with the shell selection information is dependent upon one or more criteria. For example, the server 102 may provide an indication that a second hardware component 24b may not also fit in the selected mobile phone shell due to the size of a first hardware component 24a. Referring briefly to FIG. 7, the server 102 may provide an indication 78 that a power hungry hardware component (e.g., heart monitor hardware component 76) requires a larger battery (e.g., XL battery hardware component 74). The server 102 may provide an indication that two power hungry hardware components should not both be installed into the same mobile phone. The server 102 may provide an indication 79 that a hardware component 24 is incompatible with the selected shell 12 or may be compatible with a different shell 12. For example, the server 102 may suggest that a popular hardware component 24 is compatible with a mobile phone shell 12 that is thicker or longer than the presently selected shell.

The provided subset of hardware components 24 may include individual hardware components 24 or combinations of hardware components compatible with the shell selection information. One combination may include related items, for example, a mini-USB connector, a mini-DisplayPort connector, and a mini-HDMI connector. Another combination may include a power hungry hardware component and a larger battery. Another combination may be profession specific; for example, a heart monitor hardware component and an ultrasonographic transducer hardware component. Another combination may include specifically packaged hardware components; for example, a larger battery being longer rather than thicker in order to fit in the selected shell with another hardware component. Yet another combination may include a speaker hardware component and a microphone hardware component.

The user may further customize the mobile phone 10 by selecting at least one compatible hardware component 24 from the set or subset of hardware components that are compatible with the selected shell 12. Referring to FIG. 7, a user may select the desired hardware component 24 by placing (e.g., moving, dragging, etc.) an image 80 of a hardware component 24 in an image 70 of the selected mobile phone shell 12. For example, the user may drag the "RAM" hardware component 71 from its location on the right side of the display 114 to one of the available receiver 22a-d locations. The user may reconfigure the interchangeable hardware components 24 as desired. For example, a right-handed user may put a mini-USB connector hardware component 73 on the right side of the shell 12 in order to facilitate connection and disconnection of a USB cable or device. The user selection may be sent from the client 110 to the server 102 as a first hardware selection information, and the server 102, in turn, may receive the first hardware selection information.

According to various other embodiments, the system may receive other types of information, for example, prior use information, rating information, manufacturing information, etc. Prior use information may include how often the battery was charged, the depth of the mean or median battery cycle, number of calls received, number of calls dropped, number of text messages sent, acceleration data, etc. The prior use information may be provided by a user, retrieved from the user's account information, or retrieved from the user's current phone. For example, the prior use information may be retrieved from a prior use recorder hardware component in the user's current mobile phone. The battery usage information may be used by the system to suggest an appropriately sized battery. The number of texts sent may be used to suggest a particular style of phone (e.g., a phone with a full keyboard) or texting plan. The acceleration (e.g., number of times the phone was dropped) may be used to suggest a more rugged shell, more rugged hardware components, a protective covering for the shell, or increased phone insurance. Rating information 63 may include ratings based on popularity, based on other users' opinions, or based on objective functionality testing. The manufacturing information may include manufacturing complexity (e.g., fitting two large hardware components tightly in a small shell) or availability of a hardware component (e.g., a backorder, or rarely purchased). The set of hardware components that are compatible with the selected shell and hardware may be updated in response to additional information received.

The server 102 may then provide a set of second hardware components 24, the set of second hardware component generated based on a compatibility between the second hardware component, the first hardware selection information, and shell selection information. For example, if a user selects a small, lightweight battery as a first hardware component 24, the updated set of hardware components may not include power hungry hardware components. Similarly, if the first selected hardware component is a large component, other large components may be removed from the updated sets. The system may continue to update the sets of compatible hardware as the user selects and deselects hardware components and shell styles, shapes, and size.

According to one embodiment, a user may select a preconfigured mobile phone 10. The preconfigured mobile phone 10 includes one or more hardware components 24 already in place in a receiver 22 and may include one or more empty receivers 22. The set of preconfigured phones 10 may be provided to the user based on price, popularity, a desire to reduce inventory of particular components, cost, etc. According to one embodiment, a mobile phone 10 may be preconfigured by a designer to have a certain shell 12 (e.g., colors, logos, pattern, print, picture, texture, etc.) and hardware components 24. According to another embodiment, the phone 10 may be preconfigured with combinations of hardware components 24, as described above. A user may then select from a subset of interchangeable hardware components 24 which are compatible with the one or more empty receivers 22.

According to another embodiment, the user may first select one or more hardware components 24. The user may select from a list 61 of hardware components 24 or from one or more images 80 of hardware components 24. The user may select the hardware components 24 individually or select a predefined combination of hardware components 24. The user is then provided with a set of mobile phone shells 12 generated based on a compatibility between the mobile phone shells 12 and the selected hardware components 24. The set of mobile phone shells 12 may be provided as a list 51 or as one or more images 53, 55. The compatibility may be based on at least one size value (e.g., length, area, thickness, volume, etc.), the number or orientation of receivers 22 or electrical contacts 26 within the shell, etc. The user may also provide or select cost preference information, weight preference information, or shell preference information (e.g., a shell style, shell shape, shell size, shell color, etc.). These preferences may be factored into determining the set of mobile phone shells 12 to be provided to the user.

The set of mobile phone shells 12 provided may be standard or custom shells. For example, after selecting certain "must have" hardware components 24 which do not fit in one of the available shells 12, the user may be given the option of having a custom shell 12 made to fit the components.

As described above, the system may provide an indication of dependency between certain hardware components 24 and between certain hardware components 24 and shells 12. The server 102 may also provide an indication that a particular hardware component 24 is causing an incompatibility with a shell 12. For example, if the user picked one thick hardware component 24, the system may provide an indication that that thick hardware component is preventing the selection of a thin mobile phone shell 12. The server 102 may further provide a suggestion of alternative components which may have the same functionality, but solve the incompatibility. Further, suggestions may be based on optimizations of space, weight, cost, etc. Besides using an optimization approach, heuristic, rule-based, or other ad-hoc approaches may be used to generate suggestions. For example, a user may have selected an inexpensive but larger hardware component 24, and the system may suggest the more expensive but smaller hardware component. The smaller hardware component 24 may then be compatible with thinner or otherwise smaller mobile phone shells 12.

The system may be configured to update the sets or subsets of selectable hardware components 24 and shells 12 in substantially real time. For example, upon selecting a first hardware component 24, the system may remove or indicate incompatibility of a subset of mobile phone shells 12. Or upon deselecting a hardware component 24, the system can cause other hardware components 24 and mobile phone shells 12 to be shown as compatible. According to one embodiment, selection of a hardware component 24 having a large volume may remove a mobile phone shell 12 having a small volume from possible selection. Thus a user may see how each hardware component 24 affects his or her options for mobile phone shells 12. After selecting a shell 12, the set of compatible hardware components 24 may be updated. For example, the system may provide a subset of hardware components 24 which are compatible with the previously selected hardware components 24 and the selected mobile phone shell 12. The user may continue to select additional hardware components 24 to fill out the remaining receivers 22a-d. Compatibility subsets, indications of dependency, and suggestions, may be updated with each additional selection.

Figure 8:
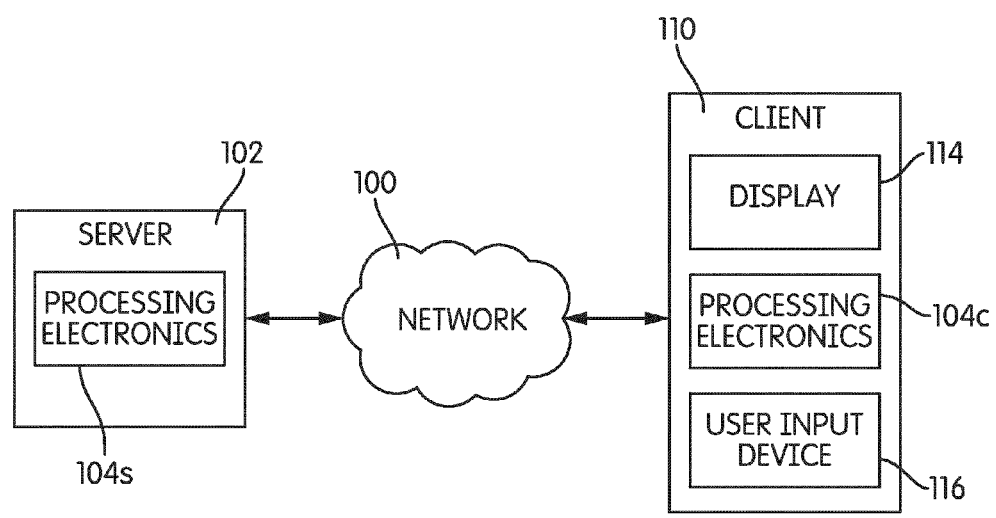
FIG. 8 is a schematic diagram of a server and a client, connected over a network and configured for using the systems and methods of this disclosure, shown according to an exemplary embodiment.

According to another embodiment, the client 110 of FIG. 8 may download mobile phone shell set data, hardware component set data, compatibility data, dependency data, and other necessary information for mobile phone customization from one or more servers 102. For example, the compatibility module 134 on the server 102 may be configured to provide phone shell set data, hardware component set data, compatibility data, and dependency data to a client 110. The customization module 132 on the client 110 may then receive information (e.g., selection information, preference information, etc.) from the user input device 116 or user interface module 130. The customization module 132 may then generate sets of shells 12 and hardware components 24 based on compatibility and provide the sets to processor 122, display 114, output 150, or another module. For example, the user may select a mobile phone shell 12 from a set of mobile phone shells 12, and the customization module 132 generates a subset of interchangeable hardware components 24 having different functions, the subset of interchangeable hardware components 24 being generated based on the compatibility between the selected mobile phone shell 12 and the set of available interchangeable hardware components 24.

Using the systems and methods described herein, one may offer to sell a hardware customizable mobile phone 110 with selectable hardware components 24 to fit within a shell 12. The seller may offer one or more mobile phone shells 12, and the seller may receive a selection of a mobile phone shell. The seller may offer a one or more selectable options for at least one hardware component 24 configured to fit within the mobile phone shell 12, and the seller may receive a selection of at least one hardware component configured to fit within the shell.

According to one embodiment, a seller may provide a price discount on a mobile phone 10 in exchange for the buyer purchasing a mobile phone 10 with a certain hardware component 24. According to another embodiment, a lessor may provide a discounted mobile phone 10 to a lessee if the mobile phone 10 contains an accident data recorder hardware component or a prior use information recorder hardware component. The accident data recorder or prior use information recorder hardware components may have a particular configuration (e.g., shape, electrical contacts, encryption key, lock, etc.) which corresponds to a particular receiver 22 in the mobile phone 10; thus making removing or replacing the recorder hardware component prohibitively difficult.

Further using the systems and methods described herein, an aftermarket customizer may sell interchangeable hardware components 24. For example, if a user already has a customizable mobile phone 10, the user may use a system to determine if another interchangeable hardware component 24 will fit in their mobile phone 10. It is contemplated that some original equipment manufacturers will use hardware or software locks on the interchangeable hardware components 24 or the receivers 22 in the mobile phone shells 12 in order to inhibit the use of uncertified or counterfeit hardware components 24.

The selected shell and hardware components may be provided to an assembler (e.g., assembly facility, manufacturer, manufacturing facility, etc.). The assembler may receive one or more styles, shapes, or sizes of mobile phone shells 12. The assembler may also receive a plurality of interchangeable hardware components 24 which are configured to fit with the mobile phone shells 12. Then the assembler may assemble one or more interchangeable hardware components 24 into a mobile phone shell 12 in response to an order. The hardware customizable mobile phone 10 may be assembled in response to a specific customization (e.g., by an end-user) or in response to a general order. For example, a retailer may order several of a particular configuration due to its popularity. Another retailer may order a particular configuration because a certain celebrity has that configuration.

Figure 10:
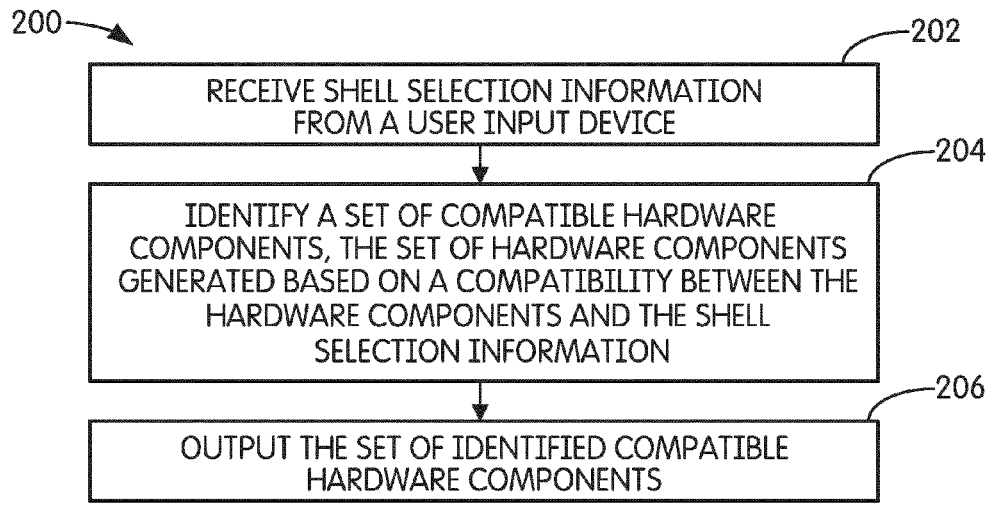
FIG. 10 is a flowchart of a process for customizing hardware for a mobile phone, shown according to an exemplary embodiment.

Referring to FIG. 10, a flowchart of a process 200 for customizing hardware for a mobile phone is shown, according to an exemplary embodiment. Process 200 is shown to include the steps of receiving shell selection information from a user input device (step 202), identifying a set of hardware components, the set of hardware components generated based on a compatibility between the hardware components and the shell selection information (step 204), and outputting the set of identified compatible hardware components (step 206). For example, according various embodiments, the step 202 of receiving the shell selection information includes receiving from a memory, a communication interface, or user input device; the step 204 of identifying the set of hardware components may be performed at processing electronics; and the step 206 of outputting the set of components includes outputting to a memory, display interface, or communication interface.

Figure 11:
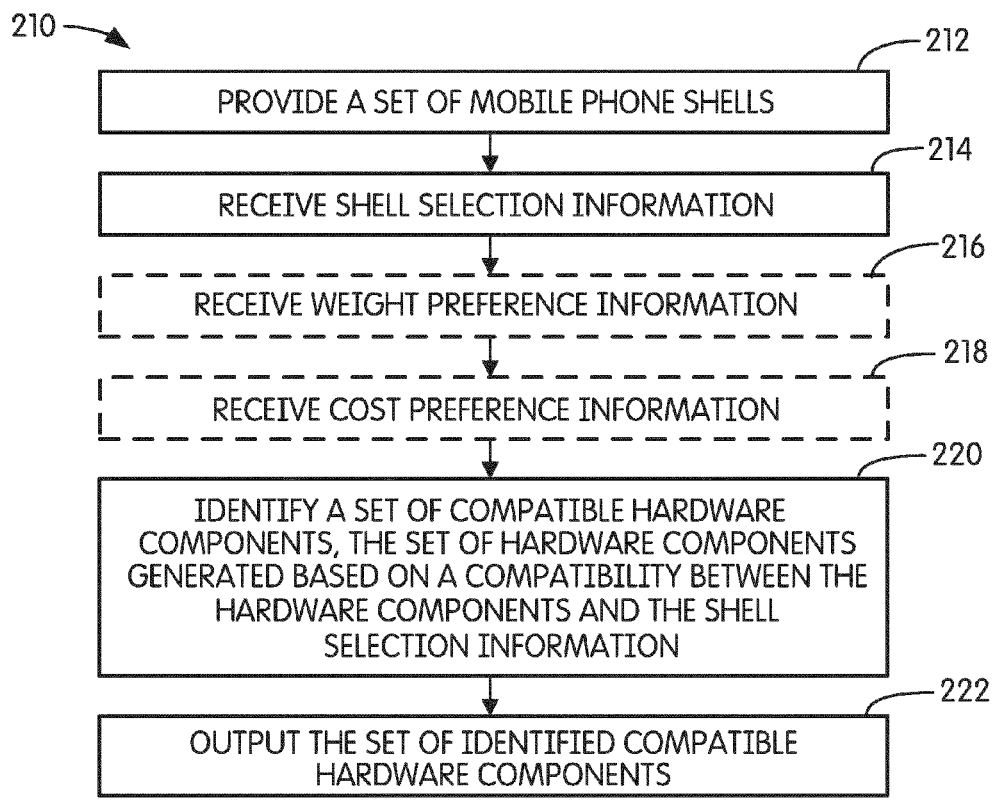
FIG. 11 is a flowchart of a process for customizing hardware for a mobile phone, shown according to another embodiment.

Referring to FIG. 11, a flowchart of a process 210 for customizing hardware for a mobile phone is shown, according to an exemplary embodiment. Process 210 is shown to include the steps of providing a set of mobile phone shells (step 212), receiving shell selection information (step 214), identifying a set of hardware components, the set of hardware components generated based on a compatibility between the hardware components and the shell selection information (step 220), and outputting the set of identified compatible hardware components (step 222). Process 210 may also include one or more of the steps of receiving weight preference information (step 216) and receiving cost preference information (step 218).

Figure 12:
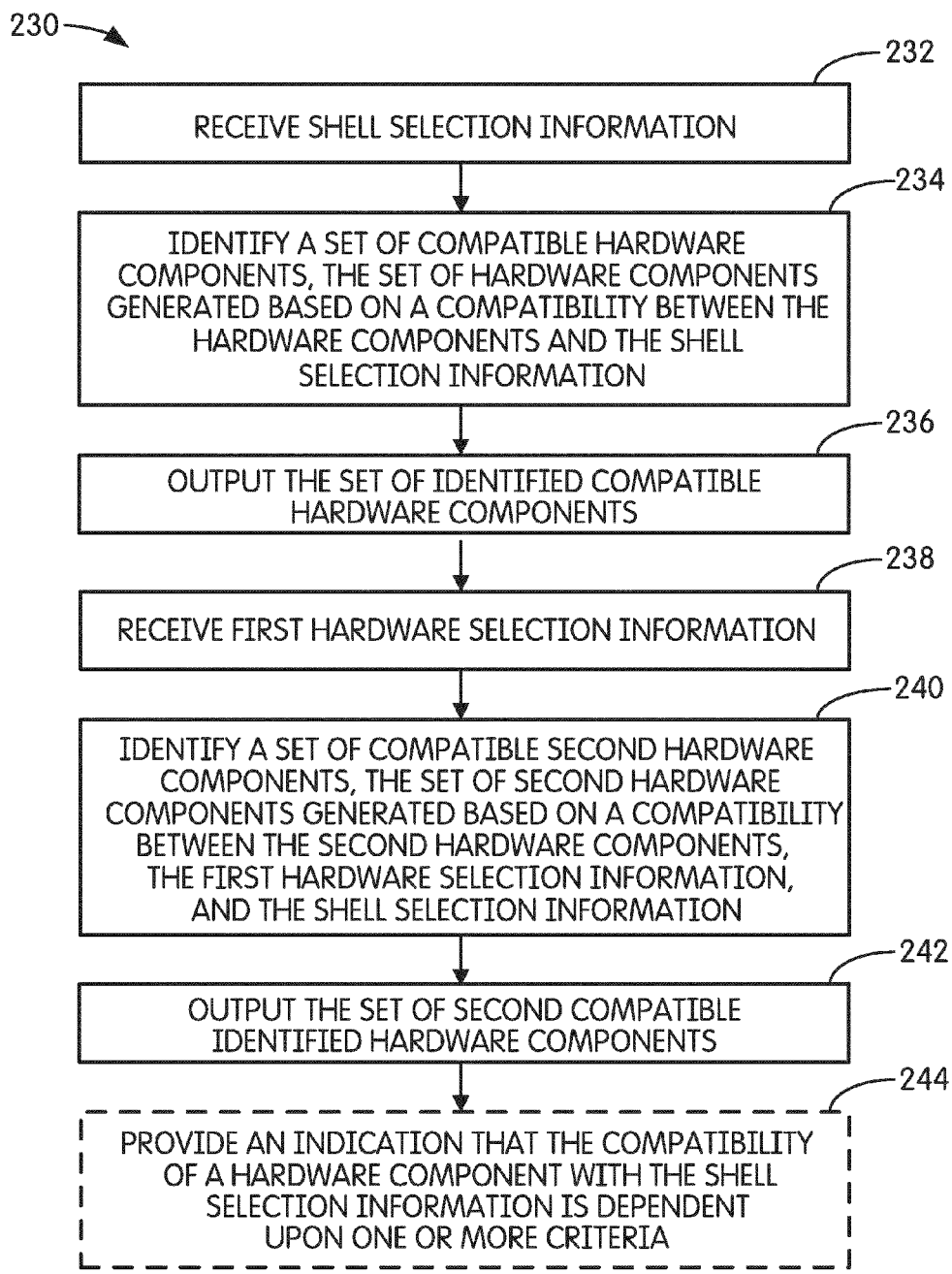
FIG. 12 is a flowchart of a process for customizing hardware for a mobile phone, shown according to another embodiment.

Referring to FIG. 12, a flowchart of a process 230 for customizing hardware for a mobile phone is shown, according to an exemplary embodiment. Process 230 is shown to include the steps of receiving shell selection information (step 232), identifying a set of hardware components, the set of hardware components generated based on a compatibility between the hardware components and the shell selection information (step 234), outputting the set of identified compatible hardware components (step 236), receiving first hardware selection information (step 238), identifying a set of compatible second hardware components, the set of second hardware components generated based on a compatibility between the second hardware components, the first hardware selection information, and the shell selection information (step 240), and outputting the set of identified second compatible hardware components (step 242). Process 230 may further include the step of providing an indication that the compatibility of a hardware component with the shell selection information is dependent upon one or more criteria (step 244).

Figure 13:
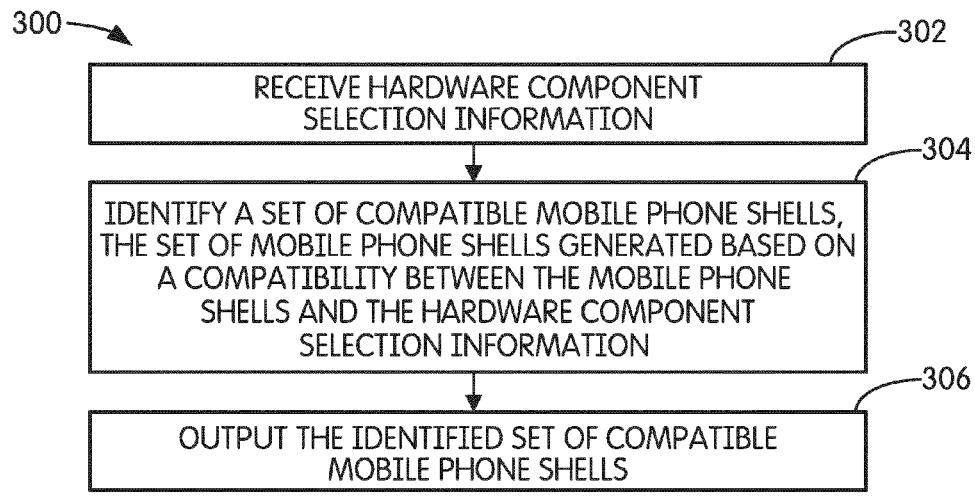
FIG. 13 is a flowchart of a process for customizing hardware for a mobile phone, shown according to another embodiment.

Referring to FIG. 13, a flowchart of a process 300 for customizing hardware for a mobile phone is shown, according to an exemplary embodiment. Process 300 is shown to include the steps of receiving hardware component selection information (step 302), identifying a set of compatible mobile phone shells, the set of mobile phone shells generated based on a compatibility between the mobile phone shells and the hardware component selection information (step 304), and outputting the identified set of compatible mobile phone shells (step 306). For example, according various embodiments, the step 302 of receiving the hardware component selection information includes receiving from a memory, a communication interface, or user input device; the step 304 of identifying the set of mobile phone shells may be performed by processing electronics; and the step 306 of outputting the set of mobile phone shells includes outputting to a memory, display interface, or communication interface.

Figure 14:
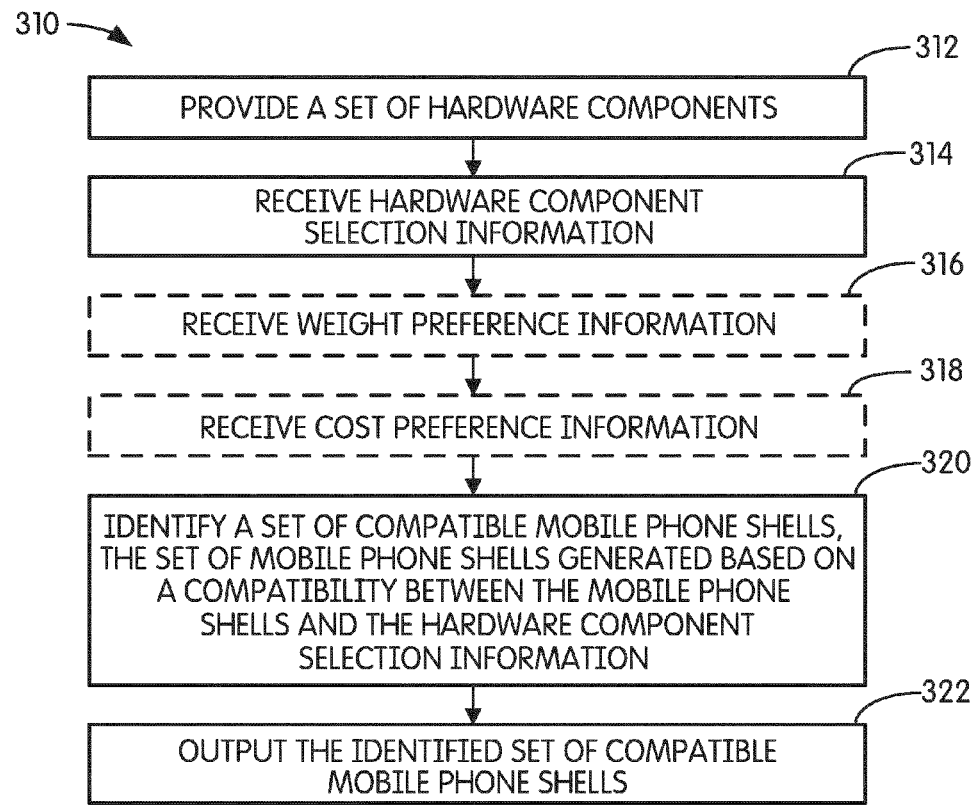
FIG. 14 is a flowchart of a process for customizing hardware for a mobile phone, shown according to another embodiment.

Referring to FIG. 14, a flowchart of a process 310 for customizing hardware for a mobile phone is shown, according to an exemplary embodiment. Process 310 is shown to include the steps of providing a set of hardware components (step 312), receiving hardware component selection information (step 314), identifying a set of compatible mobile phone shells, the set of mobile phone shells generated based on a compatibility between the mobile phone shells and the hardware component selection information (step 320), and outputting the identified set of compatible mobile phone shells (step 322). Process 310 may also include one or more of the steps of receiving weight preference information (step 316) and receiving cost preference information (step 318).

Figure 15:
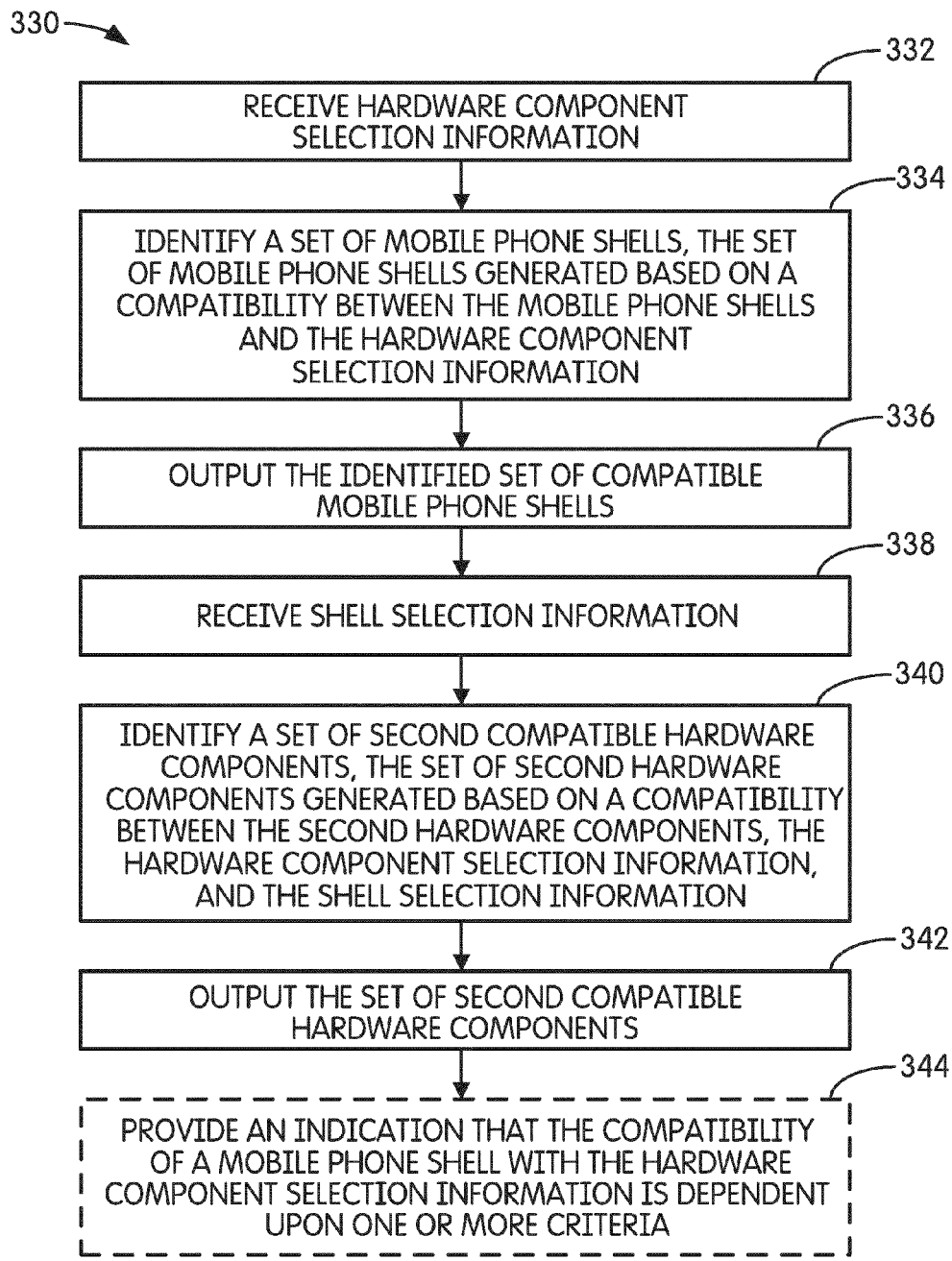
FIG. 15 is a flowchart of a process for customizing hardware for a mobile phone, shown according to another embodiment.

Referring to FIG. 15, a flowchart of a process 330 for customizing hardware for a mobile phone is shown, according to an exemplary embodiment. Process 330 is shown to include the steps of receiving hardware component selection information (step 332), identifying a set of mobile phone shells, the set of mobile phone shells generated based on a compatibility between the mobile phone shells and the hardware component selection information (step 334), outputting the identified set of compatible mobile phone shells (step 336), receiving shell selection information (step 338), identifying a set of second compatible hardware components, the set of second hardware components generated based on a compatibility between the second hardware components, the hardware component selection information, and the shell selection information (step 340), and outputting the set of second compatible hardware components (step 342). Process 330 may further include the step of providing an indication that the compatibility of a mobile phone shell with the hardware component selection information is dependent upon one or more criteria (step 340).

Figure 16:
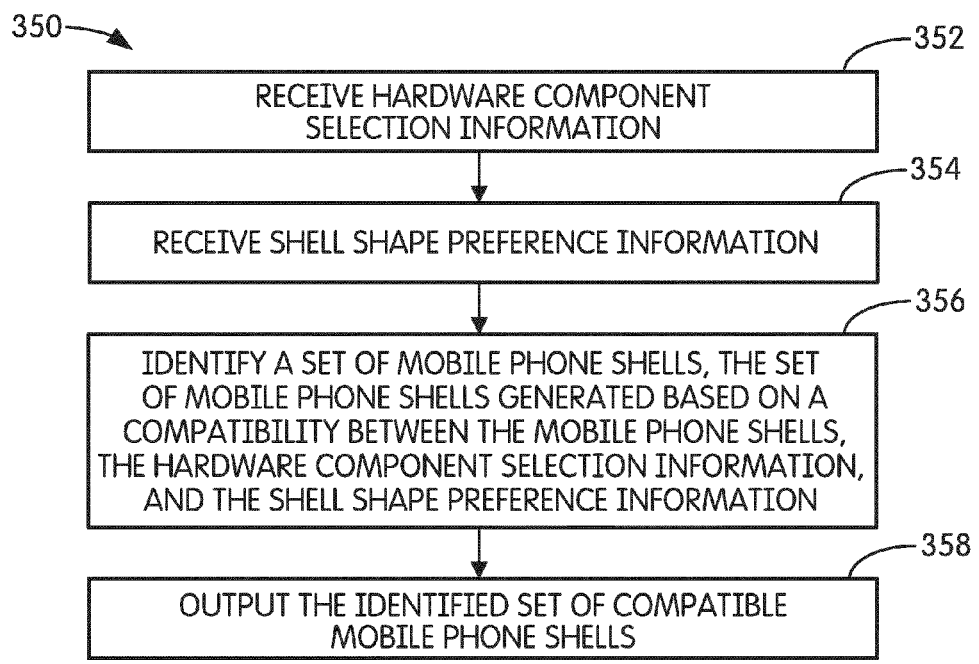
FIG. 16 is a flowchart of a process for customizing hardware for a mobile phone, shown according to another embodiment.

Referring to FIG. 16, a flowchart of a process 350 for customizing hardware for a mobile phone is shown, according to an exemplary embodiment. Process 350 is shown to include the steps of receiving hardware component selection information (step 352), receiving shell preference information (step 354), identifying a set of mobile phone shells, the set of mobile phone shells generated based on a compatibility between the mobile phone shells, the hardware component selection information, and the shell preference information (step 356), and outputting the identified set of mobile phone shells (step 358). According to various embodiments, the shell preference information may include a shell shape, shell style, and shell size.

Figure 17:
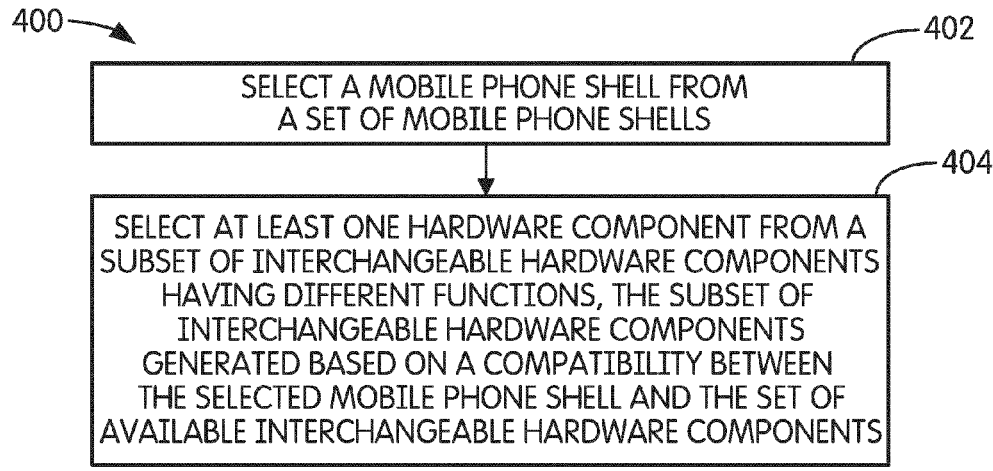
FIG. 17 is a flowchart of a process for customizing hardware for a mobile phone, shown according to another embodiment.

Referring to FIG. 17, a flowchart of a process 400 for customizing hardware for a mobile phone is shown, according to an exemplary embodiment. Process 400 is shown to include the steps of selecting a mobile phone shell from a set of mobile phone shells (step 402) and selecting at least one hardware component from a subset of interchangeable hardware components having different functions, the subset of interchangeable hardware components generated based on a compatibility between the selected mobile phone shell and the set of available interchangeable hardware components (step 404).

Figure 18:
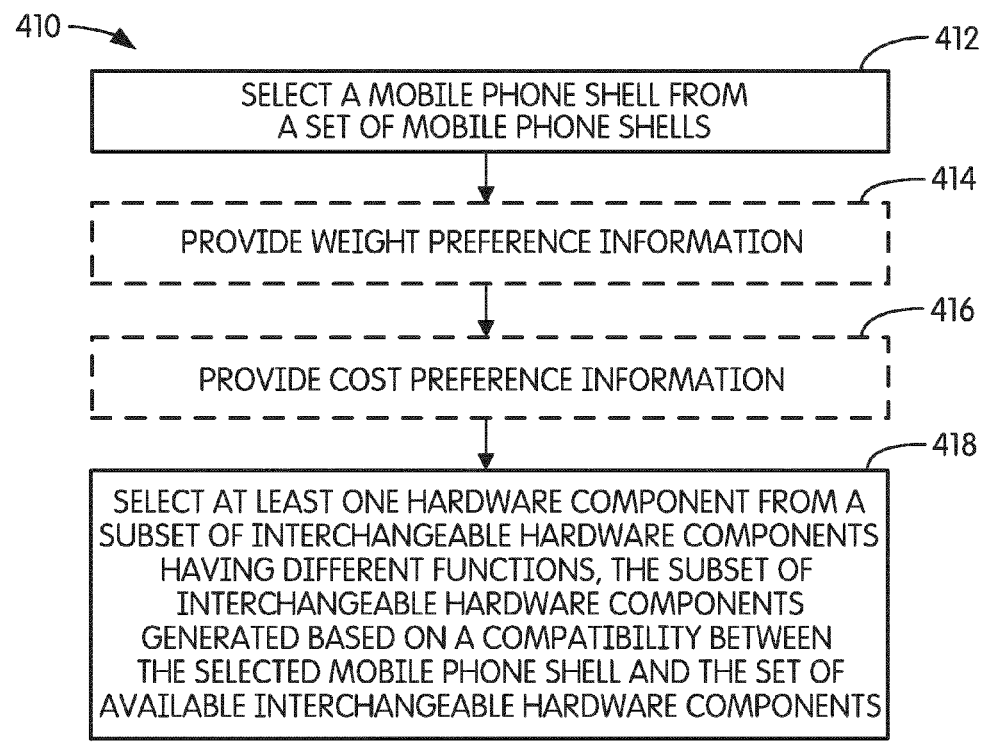
FIG. 18 is a flowchart of a process for customizing hardware for a mobile phone, shown according to another embodiment.

Referring to FIG. 18, a flowchart of a process 410 for customizing hardware for a mobile phone is shown, according to an exemplary embodiment. Process 410 is shown to include the steps of selecting a mobile phone shell from a set of mobile phone shells (step 412) and selecting at least one hardware component from a subset of interchangeable hardware components having different functions, the subset of interchangeable hardware components generated based on a compatibility between the selected mobile phone shell and the set of available interchangeable hardware components (step 418). Process 410 may also include one or more of the steps of providing weight preference information (step 414) and providing cost preference information (step 416).

Figure 19:
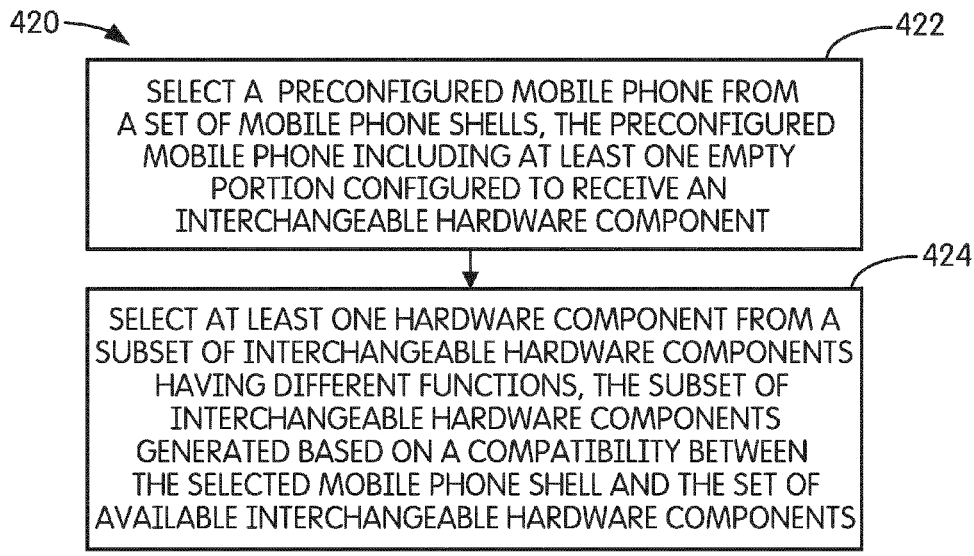
FIG. 19 is a flowchart of a process for customizing hardware for a mobile phone, shown according to another embodiment.

Referring to FIG. 19, a flowchart of a process 420 for customizing hardware for a mobile phone is shown, according to an exemplary embodiment. Process 420 is shown to include the steps of selecting a preconfigured mobile phone from a set of mobile phone shells, the preconfigured mobile phone including at least one empty portion configured to receive an interchangeable hardware component (step 422) and selecting at least one hardware component from a subset of interchangeable hardware components having different functions, the subset of interchangeable hardware components generated based on a compatibility between the selected mobile phone shell and the set of available interchangeable hardware components (step 424).

Figure 20:
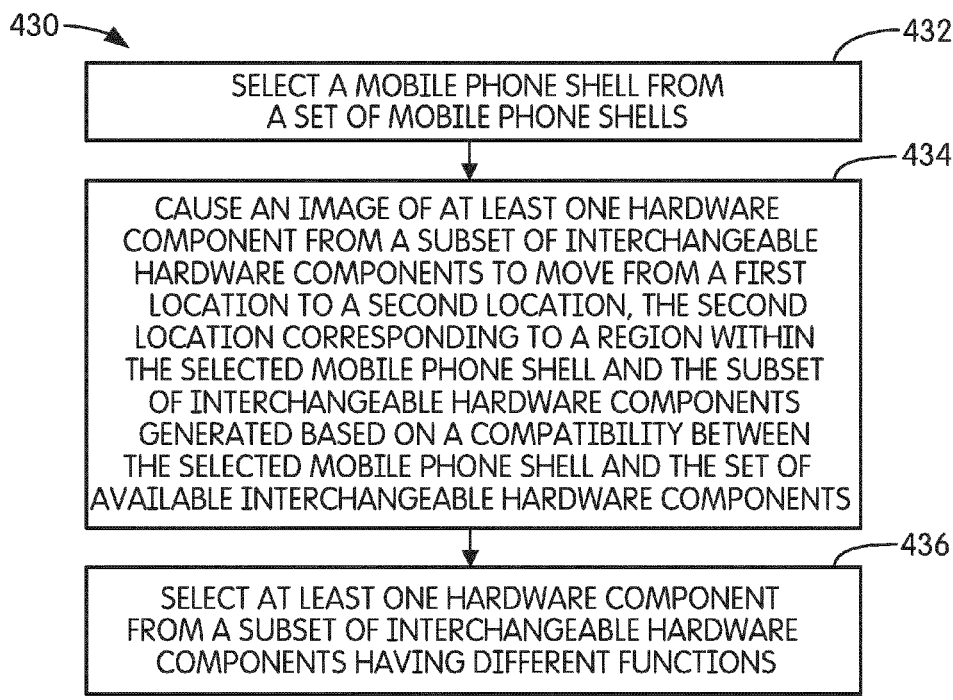
FIG. 20 is a flowchart of a process for customizing hardware for a mobile phone, shown according to another embodiment.

Referring to FIG. 20, a flowchart of a process 430 for customizing hardware for a mobile phone is shown, according to an exemplary embodiment. Process 430 is shown to include the steps of selecting a mobile phone shell from a set of mobile phone shells (step 432), causing an image of at least one hardware component from a subset of interchangeable hardware components to move form a first location to a second location, the second location corresponding to a portion within the selected mobile phone shell and the subset of interchangeable hardware components generated based on a compatibility between the selected mobile phone shell and the set of available interchangeable hardware components (step 434), and selecting at least one hardware component from a subset of interchangeable hardware components having different functions (step 436).

Figure 21:
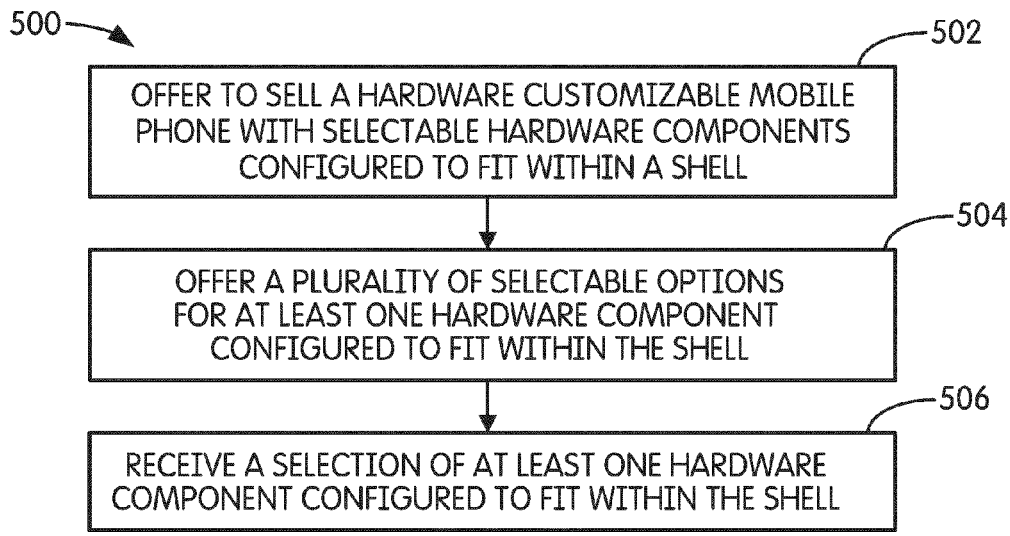
FIG. 21 is a flowchart of a process for selling a mobile phone, shown according to an exemplary embodiment.

Referring to FIG. 21, a flowchart of a process 500 for selling a mobile phone is shown, according to an exemplary embodiment. Process 500 is shown to include the steps of offering to sell a hardware customizable mobile phone with one or more selectable hardware components configured to fit within a shell (step 502), offering a plurality of selectable options for at least one hardware component configured to fit within the shell (step 504), and receiving a selection of at least one hardware component configured to fit within the shell (step 506).

Figure 22:
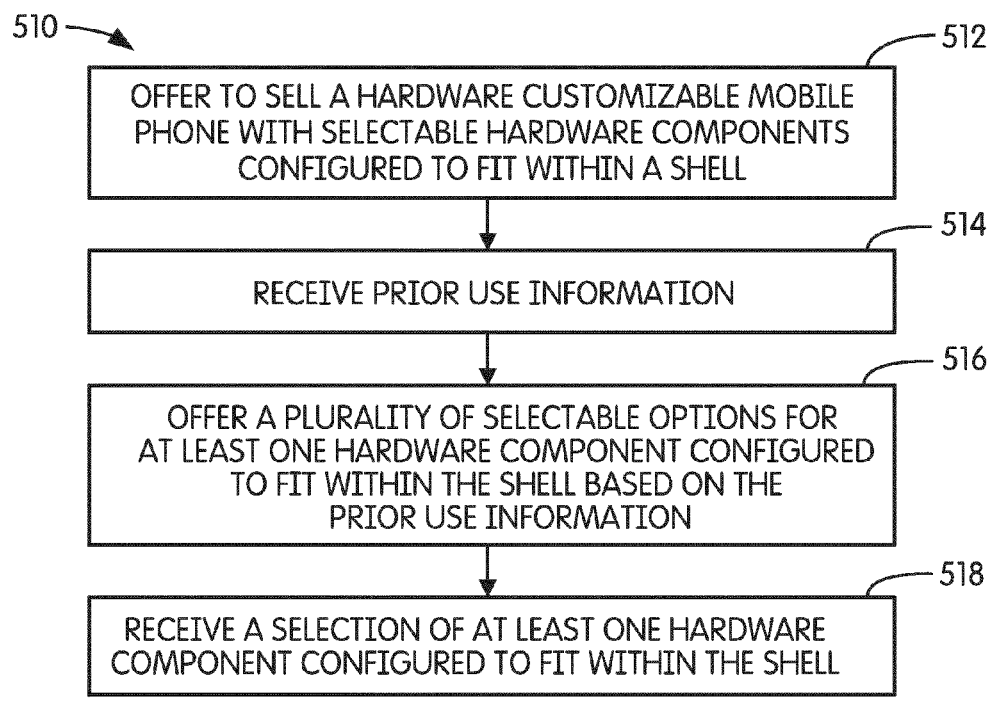
FIG. 22 is a flowchart of a process for selling a mobile phone, shown according to another embodiment.

Referring to FIG. 22, a flowchart of a process 510 for selling a mobile phone is shown, according to an exemplary embodiment. Process 510 is shown to include the steps of offering to sell a hardware customizable mobile phone with one or more selectable hardware components configured to fit within a shell (step 512), receiving prior user information (step 514), offering a plurality of selectable options for at least one hardware component configured to fit within the shell (step 516), and receiving a selection of at least one hardware component configured to fit within the shell (step 518).

Figure 23:
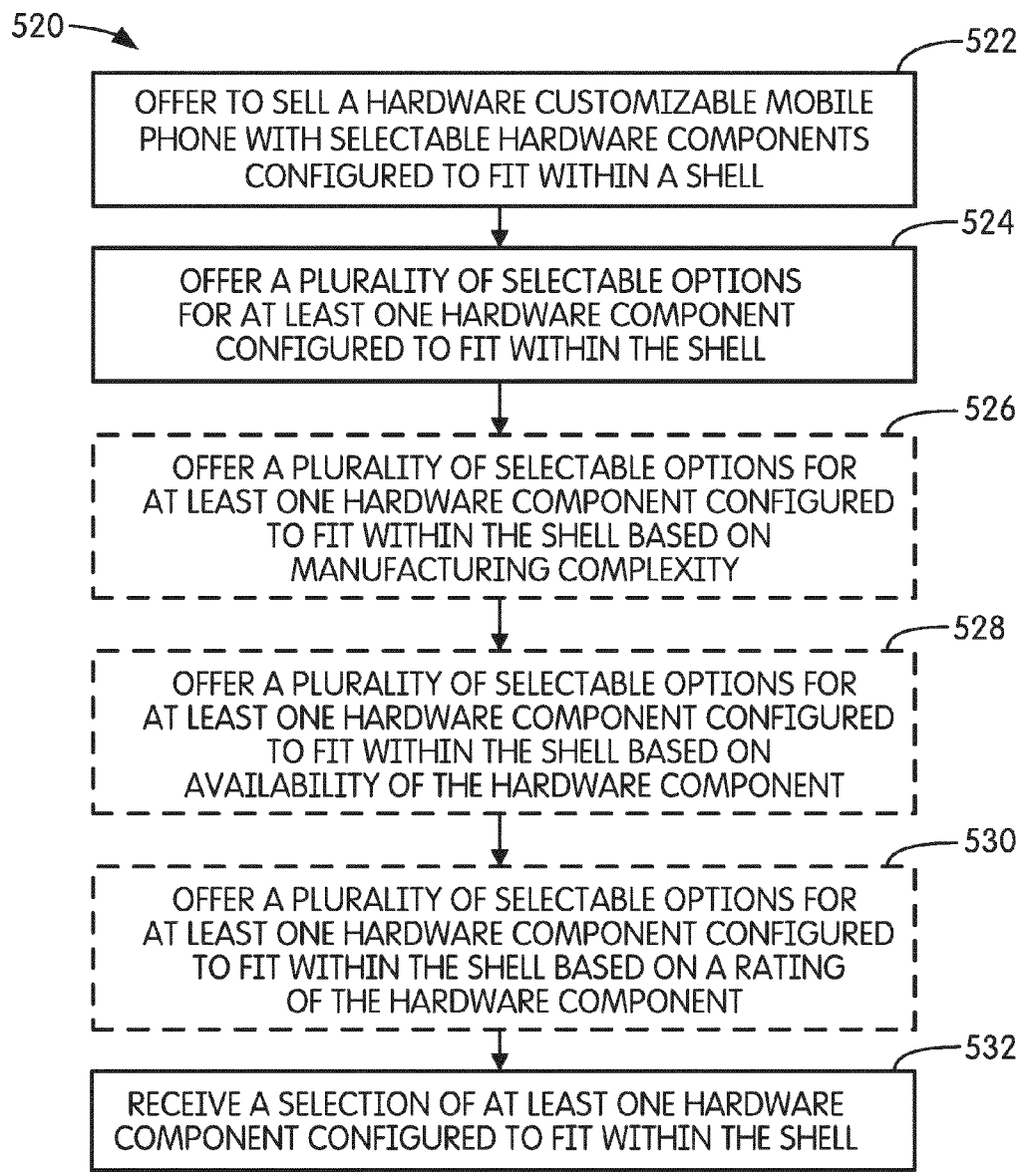
FIG. 23 is a flowchart of a process for selling a mobile phone, shown according to another embodiment.

Referring to FIG. 23, a flowchart of a process 520 for selling a mobile phone is shown, according to an exemplary embodiment. Process 520 is shown to include the steps of offering to sell a hardware customizable mobile phone with one or more selectable hardware components configured to fit within a shell (step 522), offering a plurality of selectable options for at least one hardware component configured to fit within the shell (step 524), and receiving a selection of at least one hardware component configured to fit within the shell (step 532). Process 520 may also include one or more of the steps of offering a plurality of selectable options for at least one hardware component configured to fit within the shell based on manufacturing complexity (step 526), offering a plurality of selectable options for at least one hardware component configured to fit within the shell based on availability of the hardware component (step 528), and offering a plurality of selectable options for at least one hardware component configured to fit within the shell based on a rating of the hardware component (step 530).

Figure 24:
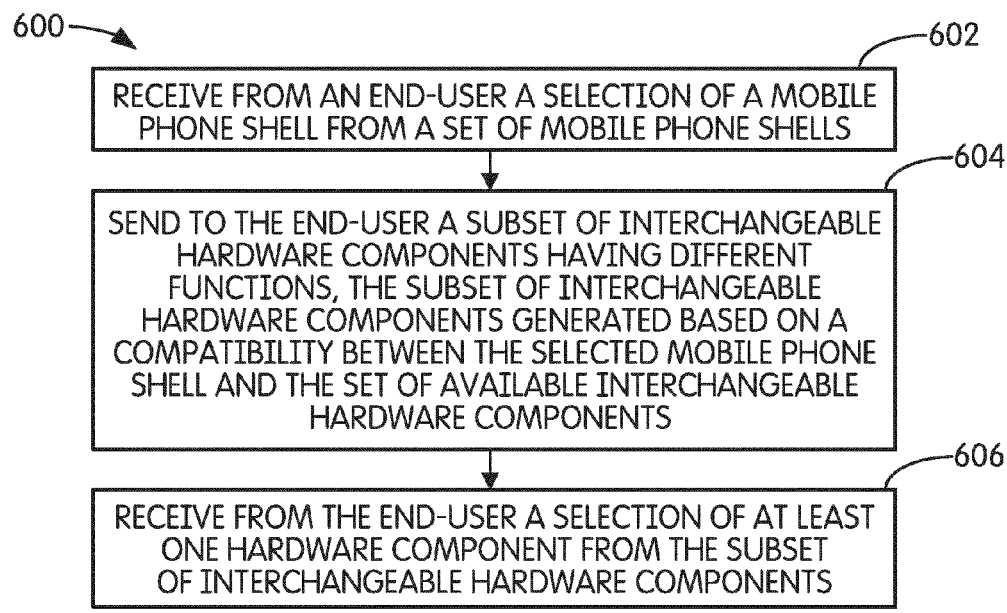
FIG. 24 is a flowchart of a process for customizing hardware for a mobile phone, shown according to another embodiment.

Referring to FIG. 24, a flowchart of a process 600 for customizing hardware for a mobile phone is shown, according to an exemplary embodiment. Process 600 is shown to include the steps of receiving from an end-user a selection of a mobile phone shell from a set of mobile phone shells (step 602), sending to the end-user a subset of interchangeable hardware components having different functions, the subset of interchangeable hardware components generated based on a compatibility between the selected mobile phone shell and the set of available interchangeable hardware components (step 604), and receiving from the end-user a selection of at least one hardware component from the subset of interchangeable hardware components (step 606).

Figure 25:
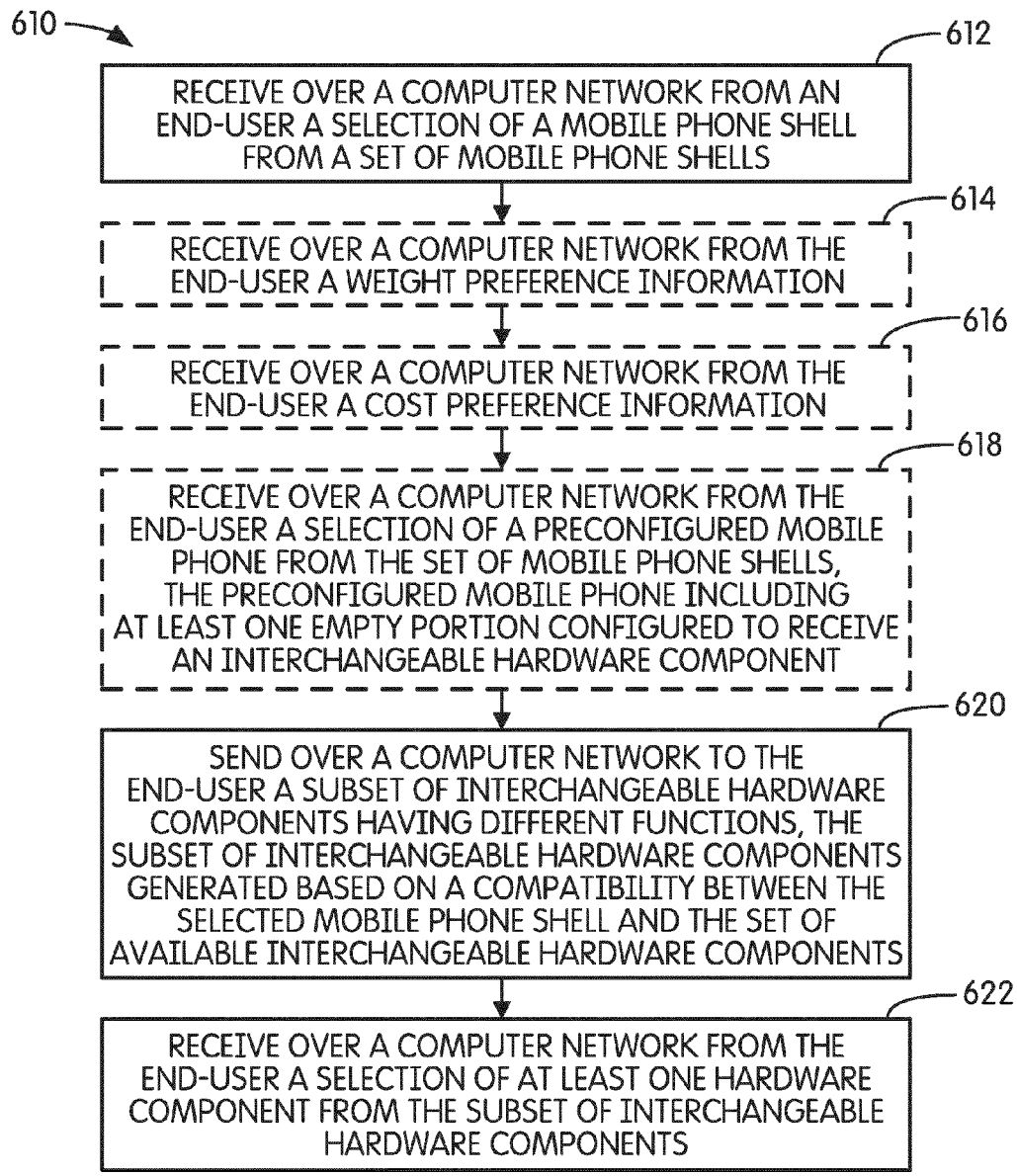
FIG. 25 is a flowchart of a process for customizing hardware for a mobile phone, shown according to another embodiment.

Referring to FIG. 25, a flowchart of a process 610 for customizing hardware for a mobile phone is shown, according to an exemplary embodiment. Process 610 is shown to include the steps of receiving over a computer network from an end-user a selection of a mobile phone shell from a set of mobile phone shells (step 612), sending over a computer network to the end-user a subset of interchangeable hardware components having different functions, the subset of interchangeable hardware components generated based on a compatibility between the selected mobile phone shell and the set of available interchangeable hardware components (step 620), and receiving over a computer network from the end-user a selection of at least one hardware component from the subset of interchangeable hardware components (step 622). The process 610 may also include the steps of receiving over a computer network from the end-user a weight preference information (step 614), receiving over a computer network from the end-user a cost preference information (step 616), and receiving over a computer network from the end-user a selection of a preconfigured mobile phone from the set of mobile phone shells, the preconfigured mobile phone including at least one empty portion configured to receive an interchangeable hardware component (step 618).

Referring now to FIGS. 26-30, in some embodiments a mobile device such as a mobile phone, laptop or tablet computer, etc. may be configured in a similar manner to mobile phone 10, and further include one or more replaceable or interchangeable hardware components configured to enable wireless energy transmission to the mobile device. For example, in some embodiments, a mobile phone is configured to receive radio frequency (RF) power signals (e.g., microwaves, etc.) and convert the microwaves into electrical energy by way of a power signal module or receiver (e.g., a rectenna, etc.). Similarly, a mobile phone may be configured to receive a laser beam (e.g., an infrared transmission, etc.) and convert the light energy to electrical energy by way of a power signal module or receiver (e.g., such as a photovoltaic cell, an optical rectenna, or similar device, etc.). In further embodiments, the mobile phone may include an inductive charging circuit configured to transform a magnetic current into electrical current usable by the mobile phone. The power signal module may be coupled to a shell of the mobile device or phone and be a replaceable/interchangeable component.

Figure 26:
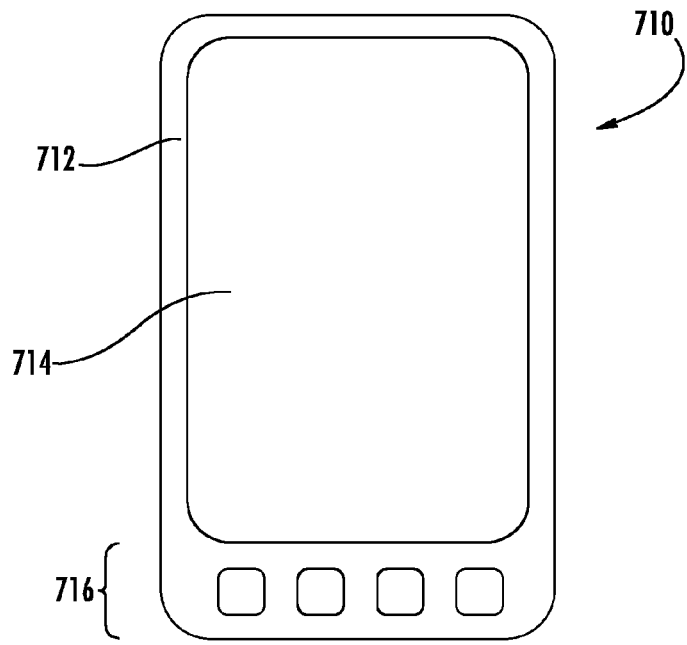
FIG. 26 is an illustration of a mobile device according to one embodiment.

Referring now to FIG. 26, mobile phone or device 710 is shown according to one embodiment, Mobile phone or device 710 is in one embodiment a mobile phone, and may share any of the features of mobile phone 10 (e.g., mobile phones 10a, 10b, 10c, 10d, etc.) disclosed herein. As shown in FIG. 26, mobile phone 710 is a touchscreen-style mobile phone, while in various alternative embodiments, mobile phone 710 may be a classic style phone (similar to mobile phone 10b), a clamshell style phone (similar to mobile phone 10c), a slide-out style phone (similar to mobile phone 10d) or another form of mobile phone or mobile device (e.g., laptop computer, tablet computer, etc.).

Figure 27:
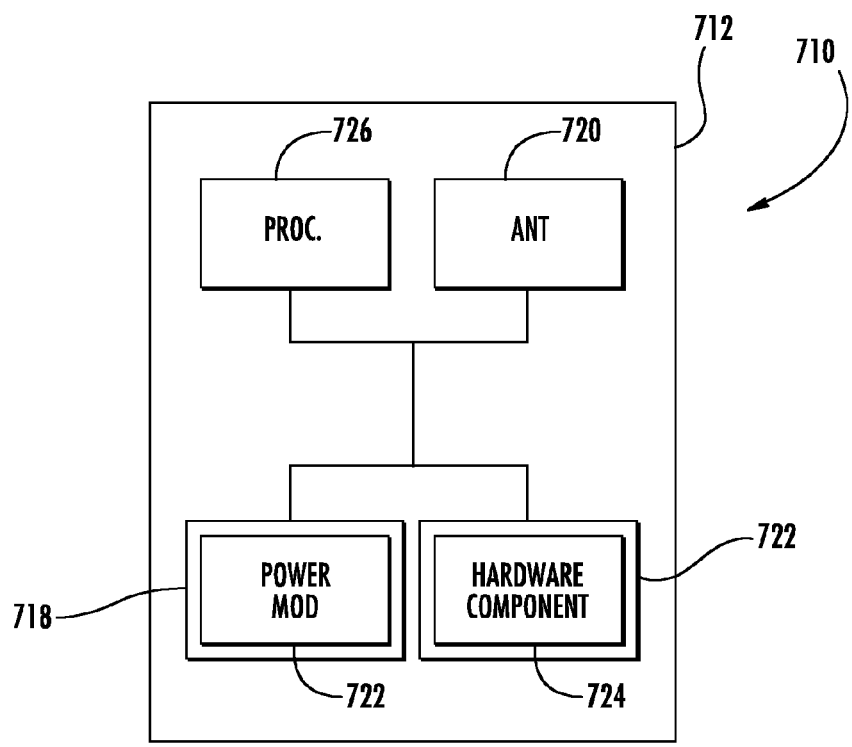
FIG. 27 is a schematic diagram of the mobile device of FIG. 26 according to one embodiment.

Referring to FIGS. 26-27, according to one embodiment, mobile phone 710 includes shell 712, display 714, and bezel- or soft-buttons 716. Mobile phone 710 further includes antenna 720, receivers 722, hardware component 724, and processing electronics 726. In one embodiment, mobile phone 710 further includes a power module 718 (e.g., a wireless power module or receiver, etc.).

Processing electronics 726 are configured to communicate with various of the other components of mobile phone 710, and may share any of the features of processing electronics 104 discussed elsewhere herein. In one embodiment, processing electronics 726 include a processor and memory. The processor may be implemented as a general-purpose processor, an application specific integrated circuit (ASIC), one or more field programmable gate arrays (FPGAs), a digital-signal-processor (DSP), a group of processing components, or other suitable electronic processing components. The memory is one or more devices (e.g., RAM, ROM, Flash Memory, hard disk storage, etc.) for storing data and/or computer code for facilitating the various processes described herein. The memory may be or include non-transient volatile memory or non-volatile memory. The memory may include database components, object code components, script components, or any other type of information structure for supporting the various activities and information structures described herein. The memory may be communicably connected to the processor and provide computer code or instructions to the processor for executing the processes described herein.

Receivers 722 (e.g., portions, regions, sockets, connectors, etc.) may be integrally formed with and/or coupled directly or indirectly to shell 712. Each receiver 722 is configured to receive, support, or couple to a hardware component 724 (e.g., a replaceable, interchangeable, and/or selectable hardware component) of a particular size and configuration. Receivers 722 may share any of the features of the other receivers disclosed herein, including receivers 22 (e.g., receivers 22a, 22b). For example, while in one embodiment each receiver 722 is of a substantially same size and shape, according to various alternative embodiments, one or more receivers may take a different size or shape from one another. In an embodiment, power module 718 and hardware component 724 are mutually interchangeable within a common receiver 722, which may be the only receiver of mobile phone 710, or which may be one of a plurality of receivers of mobile phone 710.

In one embodiment, power module 718 is configured to receive a wireless power signal and convert the wireless power signal to electrical energy usable by mobile phone 710. For example, power module 718 may be a wireless power signal receiver configured to transform various types of energy or electromagnetic radiation (e.g. RF waves, such as microwaves, light such as a laser beam, a magnetic field, etc.) into electrical energy. Power module 718 is embodied in a replaceable, interchangeable, and/or selectable hardware component (e.g., similar to hardware component 724). In some embodiments, power module 718 is selected from a set of interchangeable components having different footprint sizes and/or different footprint shapes, but having the same function.

In one embodiment, power module 718 is or includes a rectifying antenna (e.g., a rectenna, etc.) configured to convert RF signals to electrical energy (e.g., direct current electricity). The rectifying antenna includes an RF or microwave antenna and a rectifying diode. In one embodiment, power module 718 includes an integrated antenna. In other embodiments, power module 718 utilizes an existing antenna of mobile phone 710, such as antenna 720.

In an alternative embodiment, power module 718 is or includes a power signal receiver configured to convert light energy (e.g., laser beams, infrared transmissions, etc.) into electrical energy. For example, in one embodiment, power module 718 is or includes a photovoltaic cell. In other embodiments, power module 718 includes an optical rectenna, or nano-rectenna, etc. In yet further embodiments, power module 718 includes a receiver coil configured to transform a magnetic field into an electrical energy.

In one embodiment, power module 718 is configured to receive a power signal through shell 712. For example, shell 712 may be optically-transparent in one or more areas to enable transmission of an optical power signal through shell 712. For example, shell 712 may be infrared-transparent in one or more areas to enable transmission of an infrared power signal through shell 712. In other embodiments, shell 712 includes aperture 728 (see FIG. 29), and power module 718 is configured to receive a power signal through aperture 728. In further embodiments, in the case of using a light or laser beam, mobile phone 710 includes retroreflector 730 (see FIG. 29) positioned at or adjacent the infrared transparent portion of shell 712 or aperture 728. Retroreflector 730 is usable to direct a portion of incident light beams back from mobile phone 710 or power module 718 to power signal source 754 or power transmitter 750. In some embodiments, this retroreflected light energy is usable by power transmitter 750 to detect mobile phone 710 or power module 718 and to confirm that the light beam is reaching them. In yet further embodiments, all or a portion of exterior surface 719 (see FIG. 27) of power module 718 is optically-transparent and/or infrared-transparent at a frequency used by a light or laser beam for power transmission to power module 718.

Figure 28:
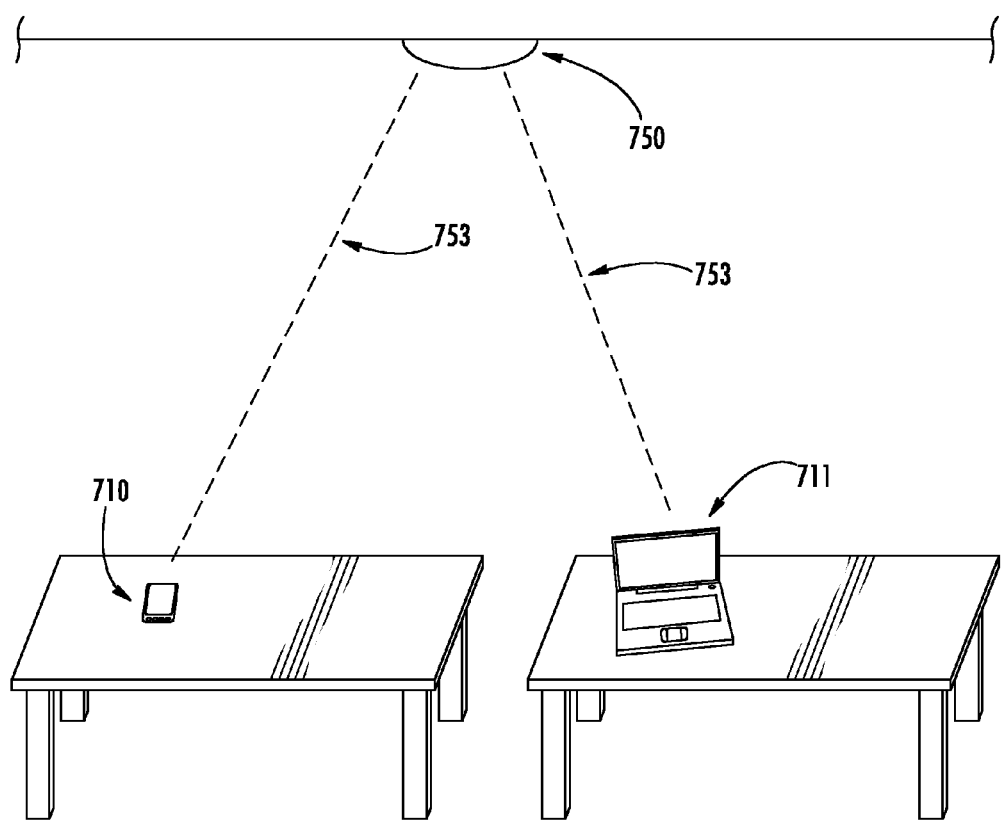
FIG. 28 is an illustration of a plurality of mobile devices and a power source according to one embodiment.
Figure 29:
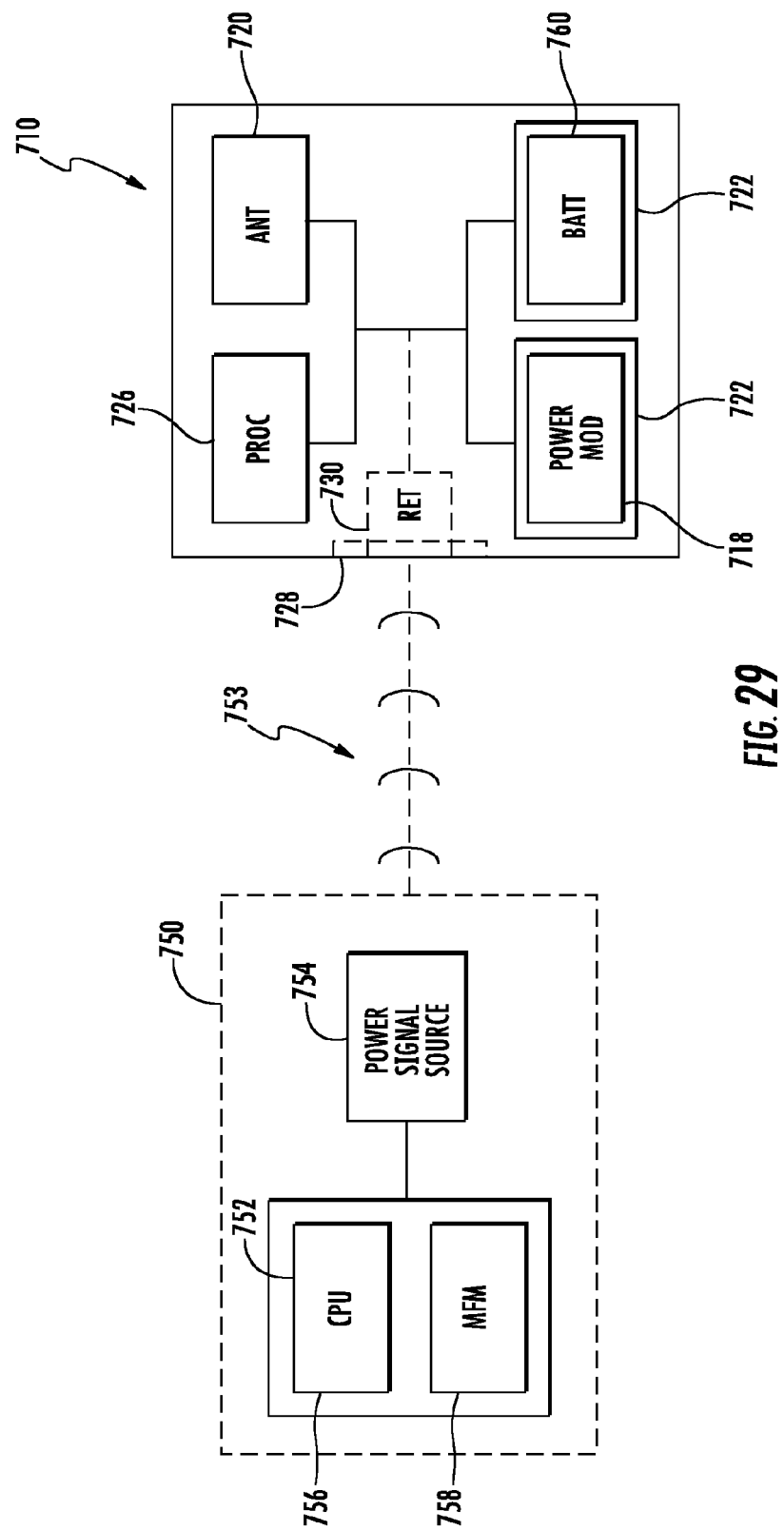
FIG. 29 is a schematic illustration of a power source and a mobile device according to one embodiment.

Referring now to FIGS. 28-29, a wireless power transmission system is shown according to one embodiment, and includes power transmitter 750 and one or more mobile devices shown as mobile phone 710 and laptop computer 711. As shown in FIG. 28, power transmitter 750 transmits one or more wireless power signals 753, which are received by devices 710, 711. As noted above, wireless power signals 753 may be or include any suitable wireless transmissions, including RF waves, light beams, a magnetic field, etc.

According to one embodiment, power transmitter 750 includes processing circuit 752 and power signal source 754. Processing circuit 752 is configured to control operation of power signal source 754 to provide wireless power signals 753 to mobile phone 710. Processing circuit 752 includes processor 756 and memory 758. Processor 756 may be implemented as a general-purpose processor, an application specific integrated circuit (ASIC), one or more field programmable gate arrays (FPGAs), a digital-signal-processor (DSP), a group of processing components, or other suitable electronic processing components. Memory 758 is one or more devices (e.g., RAM, ROM, Flash Memory, hard disk storage, etc.) for storing data and/or computer code for facilitating the various processes described herein. Memory 758 may be or include non-transient volatile memory or non-volatile memory. Memory 758 may include database components, object code components, script components, or any other type of information structure for supporting the various activities and information structures described herein. Memory 758 may be communicably connected to processor 756 and provide computer code or instructions to processor 756 for executing the processes described herein.

Power signal source 754 is configured to generate and/or transmit one or more wireless power signals to mobile phone 710 or other devices. In one embodiment, power signal source is configured to transmit RF signals (e.g., microwaves, etc.), and is or includes a microwave generator and a transmitting antenna. In other embodiments, power signal source 754 is or includes a laser system configured to generate a light or laser beam (e.g., an infrared beam, etc.) toward one or more mobile phones or other mobile devices. In further embodiments, power signal source is configured to selectively transmit RF signals and laser beams.

Power signals 753 emitted by power transmitter 750 are received by mobile phone 710 and converted into electrical energy by power module 718. In one embodiment, power module 718 includes a battery configured to be charged using at least a portion of the energy from power signal 753. In other embodiments, power module 718 is configured to provide at least a portion of the electrical energy of power signals 753 to a battery, such as battery 760, provided outside of power module 718 (e.g., a battery housed in another receiver 722, etc.).

In some embodiments, mobile phone 710 and power transmitter 750 are configured to communicate regarding wireless power transmission functionality. For example, in some embodiments, processing electronics 726 are configured to provide a request to power transmitter 750 to transmit a power signal. In further embodiments, processing electronics 726 are configured to provide a frequency for RF signals to be transmitted by power transmitter 750 and received by power module 718. In various alternative embodiments, mobile phone 710 and power transmitter 750 are configured to communicate regarding other factors associated with the wireless transmission of energy between power transmitter 750 and mobile phone 710. In an embodiment, the request can be based upon a current remaining energy level for mobile phone 710 (e.g., an energy level for a battery of mobile phone 710), can be based on projected future energy needs, etc.

Referring now to FIG. 30, method 800 of wirelessly providing energy from a remote source such as power transmitter 750 to a mobile device such as mobile device 710 is shown according to one embodiment. A mobile device is configured (810). In one embodiment, configuring the mobile device includes configuring a mobile phone to include one or more replaceable or interchangeable hardware components received within a shell of the mobile device. A communication link is (optionally) established (812). In some embodiments, a communication link is established between a mobile device such as mobile phone 710 and a power source such as power transmitter 750. A power need is determined (814). A determination is made as to whether the mobile device requires power, and this need may be communicated to a power transmitter along with other information such as a desired frequency, etc. A power signal is received by the mobile device (816). The power signal may be transmitted by a wireless power transmitter such as power transmitter 750 and received by a mobile device such as mobile phone 710. The power signal is converted into electrical energy (818). The mobile phone, and more specifically, a power module such as power module 718, converts the wireless power signal into electrical energy usable by the mobile phone.

It is also important to note that the construction and arrangement of the systems and methods as shown in the exemplary embodiments are illustrative only. Although only a few embodiments have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and assemblies disclosed herein may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the scope of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A mobile device, comprising:
a shell;
a first replaceable hardware component received within the shell; and
a second replaceable hardware component received within the shell, the second replaceable hardware component configured to receive a wireless power signal from a remote device and convert the power signal into electrical energy usable by the mobile device;
wherein the shell includes an aperture, and wherein the second replaceable hardware component is configured to receive the wireless power signal through the aperture.

2. The mobile device of claim 1, wherein the second replaceable hardware component includes a power signal receiver configured to receive the wireless power signal.

3. The mobile device of claim 2, wherein the power signal receiver includes an antenna configured to receive the wireless power signal and a rectifier configured to convert the wireless power signal to electrical energy.

4. The mobile device of claim 1, wherein the wireless power signal includes microwaves.

5. The mobile device of claim 1, wherein the wireless power signal includes a laser beam.

6. The mobile device of claim 1, wherein the wireless power signal includes an infrared transmission.

7. The mobile device of claim 1, wherein the wireless power signal includes a magnetic field.

8. The mobile device of claim 1, further comprising a processing circuit coupled to the first and second replaceable hardware components, wherein the processing circuit is configured to at least one of (i) provide a frequency for the wireless power signal to the remote device, (ii) provide a request for the wireless power signal based on a projected future energy usage of the mobile device, or (iii) provide a request for the wireless power signal based on a current remaining energy level for the mobile device.

9. The mobile device of claim 1, wherein the mobile device is a mobile phone.

10. A mobile device, comprising:
a shell;
a first replaceable hardware component received within the shell;
a second replaceable hardware component received within the shell, the second replaceable hardware component configured to receive a wireless power signal from a remote device and convert the power signal into electrical energy usable by the mobile device; and
a retroreflector at least one of coupled to the shell, integrated into the shell, or enclosed by the shell.

11. A mobile device, comprising:
a shell;
a first replaceable hardware component received within the shell;
a second replaceable hardware component received within the shell, the second replaceable hardware component configured to receive a wireless power signal from a remote device and convert the power signal into electrical energy usable by the mobile device; and
a processing circuit coupled to the first and second replaceable hardware components;
wherein the processing circuit is configured to provide a frequency for the wireless power signal to the remote device.

12. The mobile device of claim 11, wherein the shell includes an aperture, and wherein the second replaceable hardware component is configured to receive the wireless power signal through the aperture.

13. A mobile device, comprising:
a shell;
a first replaceable hardware component received within the shell;
a second replaceable hardware component received within the shell, the second replaceable hardware component configured to receive a wireless power signal from a remote device and convert the power signal into electrical energy usable by the mobile device; and
a processing circuit coupled to the first and second replaceable hardware components;
wherein the processing circuit is configured to provide a request for the wireless power signal based on a projected future energy usage of the mobile device.

14. A mobile device, comprising:
a shell;
a first replaceable hardware component received within the shell;
a second replaceable hardware component received within the shell, the second replaceable hardware component configured to receive a wireless power signal from a remote device and convert the power signal into electrical energy usable by the mobile device; and
a processing circuit coupled to the first and second replaceable hardware components;
wherein the processing circuit is configured to provide a request for the wireless power signal based on a current remaining energy level for the mobile device.

15. The mobile device of claim 14, wherein the processing circuit is configured to determine the current remaining energy level for the mobile phone based on an energy level of a battery.

16. A mobile phone, comprising:
a shell;
a first replaceable hardware component received within the shell; and
a second replaceable hardware component received within the shell, the second replaceable hardware component configured to receive a radio frequency signal from a remote device and convert the radio frequency signal into electrical energy usable by the mobile phone;
wherein the shell includes an aperture, and wherein the second replaceable hardware component is configured to receive the radio frequency signal through the aperture.

17. The mobile phone of claim 16, wherein the second replaceable hardware component includes a radio frequency receiver configured to receive the radio frequency signal.

18. The mobile phone of claim 17, wherein the radio frequency receiver includes an antenna configured to receive the radio frequency signal and a rectifier configured to convert the radio frequency signal to electrical energy.

19. The mobile phone of claim 18, wherein the antenna includes a plurality of antennas.

20. The mobile phone of claim 18, wherein the antenna includes a microwave antenna.

21. The mobile phone of claim 16, wherein the second replaceable hardware component is configured to receive the radio frequency signal through the shell.

22. The mobile phone of claim 16, wherein the first and second replaceable hardware components are selected from a set of interchangeable components having substantially the same size but different functions.

23. The mobile phone of claim 22, wherein the first and second replaceable hardware components are configured to be interchangeably disposed within a first portion of the shell.

24. A mobile phone, comprising:
a shell;
a first replaceable hardware component received within the shell; and
a second replaceable hardware component received within the shell, the second replaceable hardware component configured to receive a laser beam from a remote device and
convert the laser beam into electrical energy usable by the mobile phone;
wherein the second replaceable hardware component is configured to receive the laser beam through the shell; and
wherein at least a portion of the shell includes an infrared-transparent portion.

25. The mobile phone of claim 24, wherein the second replaceable hardware component includes a photovoltaic cell configured to receive the laser beam.

26. The mobile phone of claim 25, wherein the laser beam includes an infrared transmission.

27. The mobile phone of claim 24, further comprising a retroreflector provided within the shell adjacent the infrared-transparent portion.

28. The mobile phone of claim 24, wherein an exterior of the second replaceable hardware component includes an infrared-transparent portion.

29. The mobile phone of claim 24, wherein the shell includes an aperture, and wherein the second replaceable hardware component is configured to receive the laser beam through the aperture.

30. The mobile phone of claim 29, further comprising a retroreflector, wherein the retroreflector is at least one of coupled to the shell, integrated into the shell, or enclosed by the shell.

31. The mobile phone of claim 24, wherein the first and second replaceable hardware components are selected from a set of interchangeable components having substantially the same size but different functions.

32. The mobile phone of claim 31, wherein the first and second replaceable hardware components are configured to be interchangeably disposed within a first portion of the shell.

\* \* \* \* \*